United States Patent
Mallet et al.

(10) Patent No.: US 12,015,147 B2
(45) Date of Patent: Jun. 18, 2024

(54) ADDITIVES FOR ELECTROLYTE AND CATHODE MATERIAL IN Li-ION BATTERIES COMPRISING METAL-BASED CATHODE MATERIAL WHICH PRODUCES $M^{2+}$ METAL IONS

(71) Applicants: HYDRO-QUÉBEC, Montréal (CA); MURATA MANUFACTURING CO., LTD., Nagaokakyo (JP)

(72) Inventors: Charlotte Mallet, Montréal (CA); Jean-Christophe Daigle, St-Bruno-de-Montarville (CA); Sylviane Rochon, Saint-Adèlphe (CA); Karim Zaghib, Longueuil (CA)

(73) Assignees: HYDRO-QUÉBEC, Montréal (CA); MURATA MANUFACTURING CO., LTD., Nagaokakyo (JP)

( * ) Notice: Subject to any disclaimer, the term of this patent is extended or adjusted under 35 U.S.C. 154(b) by 613 days.

(21) Appl. No.: 17/268,120

(22) PCT Filed: Aug. 13, 2019

(86) PCT No.: PCT/CA2019/051106
§ 371 (c)(1),
(2) Date: Feb. 12, 2021

(87) PCT Pub. No.: WO2020/034031
PCT Pub. Date: Feb. 20, 2020

(65) Prior Publication Data
US 2021/0305555 A1    Sep. 30, 2021

Related U.S. Application Data

(60) Provisional application No. 62/721,327, filed on Aug. 22, 2018, provisional application No. 62/718,661, filed on Aug. 14, 2018.

(51) Int. Cl.
*H01M 4/38*       (2006.01)
*C08F 8/12*       (2006.01)
(Continued)

(52) U.S. Cl.
CPC ............. *H01M 4/38* (2013.01); *C08F 8/12* (2013.01); *C08F 212/20* (2020.02);
(Continued)

(58) Field of Classification Search
None
See application file for complete search history.

(56) References Cited

U.S. PATENT DOCUMENTS

2002/0110735 A1 * 8/2002 Farnham ............... H01M 4/587
                                                         429/330
2007/0292754 A1   12/2007 Lee et al.
(Continued)

FOREIGN PATENT DOCUMENTS

CN    101000970 A    7/2007
CN    101473487 A    7/2009
(Continued)

OTHER PUBLICATIONS

Extended European Search Report dated Apr. 13, 2022, issued by the European Patent Office in corresponding European Application No. 19850102.5-1108, (12 pages).
(Continued)

*Primary Examiner* — Gregg Cantelmo
(74) *Attorney, Agent, or Firm* — Womble Bond Dickinson (US) LLP

(57) ABSTRACT

Method of improving the performance of a Li-ion battery comprising metal-based cathode material which produces $M^{2+}$ metal ions. The method comprises using a small organic compound in association with the electrolyte of the battery or using a polymer compound in association with the
(Continued)

cathode active material of the battery. The small organic compound and the polymer compound comprise at least one chemical group suitable for forming complexes with the $M^{2+}$ metal ions thereby preventing dissolution thereof.

18 Claims, 23 Drawing Sheets

(51) Int. Cl.
    *C08F 212/14*     (2006.01)
    *H01M 4/62*     (2006.01)
    *H01M 10/0525*     (2010.01)
    *H01M 10/0567*     (2010.01)

(52) U.S. Cl.
    CPC .......... *C08F 212/22* (2020.02); *C08F 212/24* (2020.02); *H01M 4/622* (2013.01); *H01M 4/623* (2013.01); *H01M 10/0525* (2013.01); *H01M 10/0567* (2013.01)

(56) References Cited

U.S. PATENT DOCUMENTS

| | | | |
|---|---|---|---|
| 2012/0270092 | A1 | 10/2012 | Honbou et al. |
| 2013/0095382 | A1* | 4/2013 | Kim .................... H01M 4/5825 429/211 |
| 2017/0365882 | A1* | 12/2017 | Luski .................. H01M 50/414 |

FOREIGN PATENT DOCUMENTS

| | | |
|---|---|---|
| CN | 102751532 A | 10/2012 |
| CN | 107528086 A | 12/2017 |
| JP | 9-106835 | 4/1997 |
| JP | 11-26018 | 1/1999 |
| JP | 11-121012 | 4/1999 |
| JP | 2000-195548 | 7/2000 |
| JP | 2000306601 A | 11/2000 |
| JP | 2001-006731 | 1/2001 |
| JP | 2012-227068 | 11/2012 |

OTHER PUBLICATIONS

Patil, N. et al. "Recent advances in the synthesis of catechol-derived (bio )polymers for applications in energy storage and environment" Elsevier, Progress in Polymer Science, vol. 82, 2018, pp. 34-91.
Saito, Y, et al. "Synthesis of poly(dihydroxystyrene-block-styrene) (PDHSt-b-PSt) by the RAFT process and preparation of organic-solvent-dispersive Ag NPs by automatic reduction of metal ions in the presence of PDHSt-b-PSt" Chem. Commun., 2015, vol. 51, pp. 3743-3746.
Brummelhuis, N. et. "RAFT Polymerization of Alternating Styrene-Pentafluorostyrene Copolymers" Journal of Polymer Science, Part A: Polymer Chemistry, 2014, vol. 52, pp. 1555-155.
Vidu, R. et al. "Improvement of the Thermal Stability of Li-Ion Batteries by Polymer Coating of LiMn2O4" Ind. Eng. Chem. Res., 2004, vol. 43, pp. 3314-3324.
Vukovic, R. et al."Miscibility in blends of phenylsulfonylated poly(2,6-dimethyl-1,4-phenylene oxide) and poly(p-fluorostyrene-co-o-fluorostyrene)" Polymer, vol. 35, No. 14, 1994, pp. 3055-3059.
Office Action dated Jan. 28, 2023, by the National Intellectual Property Administration in corresponding Chinese Patent Application No. 201980053106.9, and an English Translation of the Office Action. (35 pages).
Lau, W. Y. et al. "Polymerization behavior of 2,6-dimethoxystyrene" Canadian Journal of Chemistry. vol. 47, 1969, pp. 2057-2060.
Daly, W. H. et al. "Synthesis of Poly (Vinylcatechols)" John Wiley & Sons, Inc., Journal of Polymer Science: Polymer Symposium, vol. 74, pp. 227-242, 1986.
Office Action in Chinese Application No. 201980053106.9, mailing date Feb. 24, 2024.
"Simplified Polymer Mimics of Cross-Linking Adhesive Proteins", Westwood et al., Macromolecules 2007, 40, 3960-3964.
Chemical Reactions On Redox Polymer Precursors-I. Chloromethylation and Lithiation, Moulay et al., Eur. Polym. J., vol. 33 No. 6, pp. 929-935, 1997.
The synthesisof poly(3,4-dihydroxystyrene) and poly[(sodium4-styrenesulfonate)-co-(3,4-dihydroxystyrene)], Yang et al., Mucromol. Rapid Commun. 19,241-246 (1998).
"Synthesis and Gas Transport Properties of Polypentafluorostyrene", Belov et al., Petroleum Chemistry, 2017, vol. 57, No. 11, pp. 923-928.
Hearing Notice in Indian Application No. 202117006021 mailed on Mar. 20, 2024.
Patil Nagaraj et al., "Recent advances in the synthesis of catechol-derived (bio)polymers for applications in energy storage and environment", Progress in Polymer Science, vol. 82, Jul. 1, 2018 (Jul. 1, 2018), XP055908860, GB ISSN: 0079-6700, DOI: 10.1016/j.progpolymsci.2018.04.002 (Abstract).
Saito, Yuta et al., "Synthesis of poly(dihydroxystyrene-block-styrene) (PDHSt-b-PSt) by the RAFT process and preparation of organic-solvent-dispersive Ag NPs by automatic reduction of metal ions in the presence of PDHSt-b-PSt" As featured in: Showcasing work from the Organized Polymer Materials Laboratory, directed by Dr Hiroshi Yabu, Jan. 1, 2015 (Jan. 1, 2015), XP055908852, Retrieved from the Internet: URL:https://pubs.rsc.org/en/content/articlepdf/2015/cc/c4cc08366k (Abstract).
Brummelhuis Niels Ten et al., "RAFT polymerization of alternating styrene-pentafluorostyrene copolymers", Journal of Polymer Science Part A: Polymer Chemistry, vol. 52, No. 11, Mar. 13, 2014 (Mar. 13, 2014), XP055908857, US ISSN: 0887-624X, Doi: 10.1002/pola.27148 Retrieved from the Internet: URL: https://onlinelibrary.wiley.com/doi/full-XML/10.1002/pola.27148 (Abstract).
Vidu Ruxandra et al., "Improvement of the Thermal Stability of Li-Ion Batteries by Polymer Coating of LiMn 2 0 4", Industrial & Engineering Chemistry Research, vol. 43, No. 13, May 29, 2004 (May 29, 2004), XP055909025, ISSN: 0888-5885, DOI: 10.1021/ie034085z (Abstract).
Vukovic R et al., "Miscibility in blends of phenylsulfonylated poly(2,6-dimethy1-1,4-phenylene oxide) and poly(p. fluorostyrene-co-o-fluorostyrene)", Polymer, Elsevier, Amsterdam, NL, vol. 35, No. 14, Jul. 1, 1994 (Jul. 1, 1994), XP024120749, ISSN: 0032-3861, DOI: 10. 1016/0032-3861(94)90419-7 (Abstract).

\* cited by examiner

ADDITIVES FOR ELECTROLYTE AND CATHODE MATERIAL IN Li-ION BATTERIES COMPRISING METAL-BASED CATHODE MATERIAL WHICH PRODUCES $M^{2+}$ METAL IONS

FIELD OF THE INVENTION

The present invention relates generally to Li-ion batteries, in particular Li-ion batteries wherein the cathode comprises metal-based material capable of producing $M^{2+}$ metal ions. More specifically, the present invention relates to additives for use in association with the electrolyte and additives (binders) for use in association with the cathode material, in such batteries. The additives according to the invention allow for the prevention of the $M^{2+}$ metal ions dissolution, which leads to an improvement of the performance of the battery.

BACKGROUND OF THE INVENTION

Li-ion batteries are widely used as energy source, and the demand is increasing. Typically, such battery comprises a negative electrode or anode, a positive electrode or cathode, and an electrolyte provided between the two spaced-apart electrodes. The electrolyte may comprise organic molecules or polymers and generally also comprises a lithium salt such as $LiPF_6$, LiTFSI or LiFSI. Moreover, the electrolyte may comprise linear carbonates such as dimethyl carbonate (DMC), diethyl carbonate (DEC), ethylmethyl carbonate (EMC) or cyclic carbonates such as ethylene carbonate (EC), propylene carbonate (PC) and butylene carbonate (BC).

The cathode active material in Li-ion batteries typically comprises lithium-containing materials, particularly lithium metal oxides having the form $LiMO_2$ with M=Mn, Co, Ni. These include $LiCoO_2$ (lithium cobalt oxide), $LiMnO_2$ (lithium manganese dioxide) and $LiNiO_2$ (lithium nickel oxide). Other lithium metal oxides such as $LiMn_2O_4$ (lithium manganese oxide; LMO) and lithium manganese iron phosphate (LMFP) are also used. The cathode material also comprises a binder including polyvinylidene fluoride (PVDF), styrene-butadiene rubber (SBR), carboxymethyl cellulose (CMC), ethylene propylene diene monomer (EPDM), poly(acrylic acid), poly(vinyl alcohol), poly(acrylonitrile) or the like, and carbon-based material.

Metal-based Li-containing active cathode materials capable of producing $M^{2+}$ metal ions, including Mn-based Li-containing active cathode materials such as $LiMnO_2$, $LiMn_2O_4$ and LMFP are widely used, and do present some advantages. For example, they are relatively inexpensive to obtain, they present a good thermal stability during overcharging when compared to other active materials, and they have a relatively low footprint on the environment. However, their use presents a few drawbacks. For example, regarding Mn-based cathode material, $Mn^{2+}$ ions dissolution generally occurs, which leads to voltage fading and reduction of the plateau related to Mn [1-3].

Methods are known in the art, for improving the performance of a Li-ion battery which uses a cathode comprising an Mn-based active material [4-7]. Some of these methods are based on the prevention of $Mn^{2+}$ ions dissolution. This may rely on the formation of complexes between $Mn^{2+}$ ions and suitable compounds bearing certain chemical groups [6,7].

There is still a need for methods of improving the performance of Li-ion batteries. More specifically, there is a need for methods of preventing metal ions dissolution in Li-ion batteries comprising metal-based cathode materials which produce $M^{2+}$ metal ions.

SUMMARY OF THE INVENTION

The inventors have designed and prepared an additive for use in association with the electrolyte in a Li-ion battery comprising a metal-based cathode material capable of producing $M^{2+}$ metal ions. The additive of the invention is added to the electrolyte; and allows for the prevention of the $M^{2+}$ ions dissolution.

More specifically, the additive of the invention for use in association with the electrolyte is a small organic molecule as described herein below. The small organic compound comprises at least one chemical group suitable for forming complexes with the $M^{2+}$ metal ions. Also, the small organic compound is compatible with the electrolyte as well as other components of the battery.

Also, the inventors have designed and prepared an additive (binder) for use in association with the cathode material in a Li-ion battery comprising a metal-based cathode material capable of producing $M^{2+}$ metal ions. The additive according to this aspect of the invention is a binder. The binder is mixed with the cathode material; and allows for the prevention of the $M^{2+}$ ions dissolution.

More specifically, the additive or binder of the invention for use in association with the cathode material is a polymer compound as described herein below. The polymer compound comprises at least one chemical group suitable for forming complexes with the $M^{2+}$ metal ions. Also, the polymer compound is compatible with the cathode active material as well as other components of the battery.

The invention thus provides the following in accordance with aspects thereof:

(1) A method of improving the performance of a Li-ion battery comprising metal-based cathode material which produces $M^{2+}$ metal ions, the method comprising using a small organic compound in association with the electrolyte of the battery, wherein the small organic compound comprises at least one chemical group suitable for forming complexes with the $M^{2+}$ metal ions thereby preventing dissolution thereof.

(2) A method for preventing metal ions dissolution in a Li-ion battery comprising metal-based cathode material which produces $M^{2+}$ metal ions, the method comprising using a small organic compound in association with the electrolyte of the battery, wherein the small organic compound comprises at least one chemical group suitable for forming complexes with the $M^{2+}$ metal ions.

(3) The method according to (1) or (2) above, wherein the $M^{2+}$ metal ions are selected from the group consisting of: $Mn^{2+}$, $Fe^{2+}$, $Ca^{2+}$ and other divalent metal ions; preferably the metal-based cathode material is an Mn-based cathode material.

(4) The method according to (1) or (2) above, wherein the small organic compound is added to the electrolyte.

(5) The method according to any one of (1) to (4) above, wherein the small organic compound has a general formula I outlined below

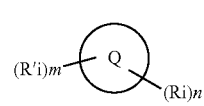

I wherein:
Q is a 5 to 12-member ring or bicycle ring, optionally the ring comprises one or more heteroatom which are the same or different; Ri and R'i are each independently selected from H, alkyl, cycloalkyl, alkene, alkyne, aryl and alkylaryl, alkoxy, thioalkoxy, OH, SH, $NH_2$, a halogen atom, a halogeno alkyl, a halogeno alkoxy, a halogeno thioalkoxy, a cyano alkyl, a cyano alkene, a cyano alkyne, CN, $NO_2$, $SO_2$, COOH and acyloxycarbonyl, with the proviso that at least one of Ri and R'i comprises a heteroatom; n and m are each independently an integer from 0 to 11, with the proviso that they are not both 0 at the same time; and the heteroatom is selected from O, S and N.

(6) The method according to (5) above, wherein at least two of Ri and R'i comprise a heteroatom, and the at least two of Ri and R'i are attached to consecutive carbon atoms of the ring; or when Q is a bicycle ring the at least two of Ri and R'i are spatially close to each other.

(7) The method according to (5) or (6) above, wherein the small organic compound has a general formula II outlined below

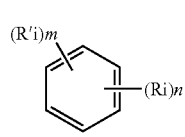

II wherein: Ri and R'i are as defined in (5) above, and are both different from H; and n and m are as defined in (5) above, and n=2-4 or n=2 and m=1.

(8) The method according to (5) or (6) above, wherein the small organic compound has a general formula III outlined below

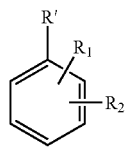

III wherein $R_1$, $R_2$ and R' are each as defined in (7) above for Ri and R'i.

(9) The method according to (5) or (6) above, wherein the small organic compound has a general formula IV outlined below

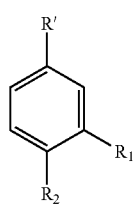

IV wherein $R_1$, $R_2$ and R' are each as defined in (7) above for Ri and R'i.

(10) The method according to (5) or (6) above, wherein the small organic compound has a general formula V outlined below

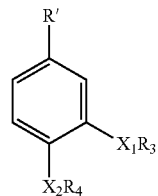

V wherein: R' is as defined in (6) above for Ri and R'i; $R_3$ and $R_4$ are each independently H or a $C_{1-6}$ alkyl; and $X_1$ and $X_2$ are each independently a heteroatom, preferably the heteroatom is O, S or N, more preferably the heteroatom is O.

(11) The method according to (5) or (6) above, wherein the small organic compound is selected from Compound A, Compound B, Compound C, and Compound D outlined below

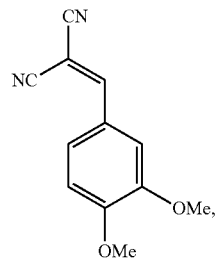

Compound A

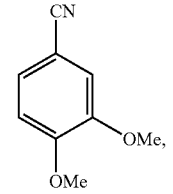

Compound B

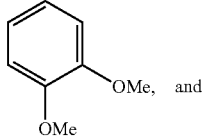

Compound C

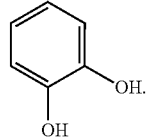

Compound D

(12) An electrolyte comprising the small organic compound as defined in any one of (1) to (11) above.

(13) A battery comprising the electrolyte as defined in (12) above.

(14) A polymer compound having a general formula VI outlined below

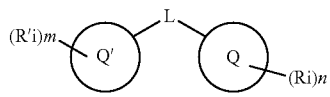

VI wherein: Q and Q' are each independently a 5 to 12-member ring or bicycle ring, optionally the ring comprises one or more heteroatom which are the same or different; L a linker comprising alkyl groups; Ri and R'i are each independently selected from H, alkyl, cycloalkyl, alkene, alkyne, aryl and alkylaryl, alkoxy, thioalkoxy, OH, SH, $NH_2$, a halogen atom, a halogeno alkyl, a halogeno alkoxy, a halogeno thioalkoxy, a cyano alkyl, a cyano alkene, a cyano alkyne, CN, $NO_2$, $SO_2$, COOH and acyloxycarbonyl, with the proviso that at least one of Ri comprises a heteroatom and at least one of R'i is different from H; n and m are each independently an integer from 0 to 11 with the proviso that they are not both 0 at the same time; and the heteroatom is selected from O, S and N.

(15) The polymer according to (14) above, wherein at least two of Ri comprise a heteroatom, and the at least two of Ri are attached to consecutive carbon atoms of the ring; or when Q is a bicycle ring the at least two of Ri are spatially close to each other.

(16) The polymer according to (14) or (15) above, wherein the at least one R'i is a halogen atom, preferably F.

(17) A polymer compound having a general formula VII outlined below

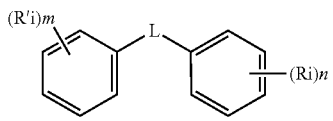

VII wherein: L is as defined in (14) above; Ri is as defined in (15) above; R'i is as defined in (16) above; and n and m are each as defined in (14) above.

(18) A polymer compound having a general formula VIII outlined below

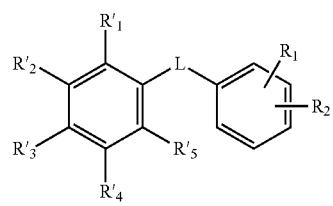

VIII wherein: both $R_1$ and $R_2$ comprise a heteroatom; $R'_{1-5}$ are each as defined in (16) above for R'i; and L is as defined in (14) above.

(19) The polymer according to (18) above, wherein both $R_1$ and $R_2$ comprise a heteroatom, and are attached to consecutive carbon atoms of the ring.

(20) A polymer compound having a general formula IX outlined below

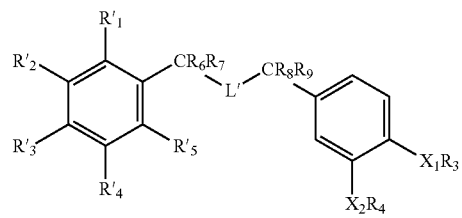

IX wherein: $R_3$, $R_4$ and $R_{6-9}$ are each independently H or a $C_{1-6}$ alkyl; $R'_{1-5}$ are each as defined in (18) above; L' is as defined in (14) above for L, preferably L' is constituted of repeating units of $CR_6R_7$ and $CR_8R_9$; and $X_1$ and $X_2$ are each independently a heteroatom, preferably the heteroatom is O, S or N, more preferably the heteroatom is O.

(21) A polymer having a formula P outlined below

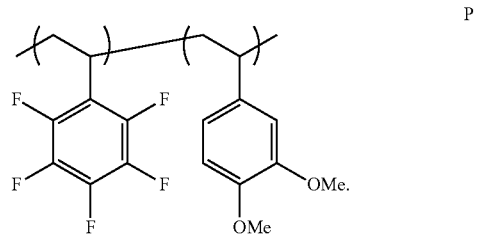

P

(22) A polymer having a formula P' outlined below

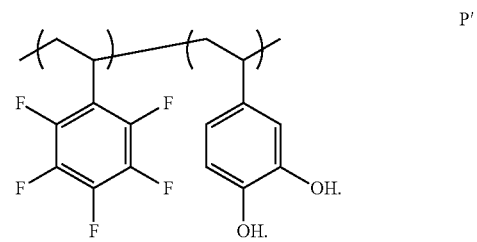

P'

(23) A polymer of formula P, which comprises 48 mol % of dimethoxystyrene moities (Polymer dimethoxy-1).
(24) A polymer of formula P, which comprises 70 mol % of dimethoxystyrene moities (Polymer dimethoxy-2).
(25) A polymer of formula P, which comprises 100 mol % of dimethoxystyrene moities (Polymer dimethoxy-3).
(26) A polymer of formula P', which comprises 50 mol % of dihydroxystyrene moities (Polymer difydroxy-1).
(27) A method of improving the performance of a Li-ion battery comprising metal-based cathode material which produces $M^{2+}$ metal ions, the method comprising using a polymer compound in association with the cathode material of the battery, wherein the polymer compound comprises at least one chemical group suitable for forming complexes with the $M^{2+}$ metal ions thereby preventing dissolution thereof.
(28) A method of preventing metal ions dissolution in a Li-ion battery comprising metal-based cathode material which produces $M^{2+}$ metal ions, the method comprising using a polymer compound in association with the cathode of the battery, wherein the polymer compound comprises at least one chemical group suitable for forming complexes with the $M^{2+}$ metal ions.

(29) The method according to (27) or (28) above, wherein the $M^{2+}$ metal ions are selected from the group consisting of: $Mn^{2+}$, $Fe^{2+}$, $Ca^{2+}$ and other divalent metal ions; preferably the metal-based cathode material is a Mn-based cathode material.

(30) The method according to any one of (27) to (29) above, wherein the polymer compound is added to the cathode material.

(32) A method of preventing metal ions dissolution in a Li-ion battery comprising metal-based cathode material which produces $M^{2+}$ metal ions, the method comprising using a polymer compound in association with the cathode material of the battery, wherein the polymer compound is as defined in any one of (14) to (26) above.

(33) A cathode material comprising the polymer compound as defined in any one of (14) to (26) above.

(34) A battery comprising the cathode material as defined in (33) above.

(35) A method for preparing the polymer compound as defined in any one of (14) to (26) above, comprising submitting a dialkyloxystyrene compound and a pentahalogenostyrene compound to a random copolymerization to obtain an alkyoxystyrene polymer; and optionally submitting the alkyoxystyrene polymer to a dealkylation process to obtain a hydroxy polymer compound.

(36) The method according to (35) above, wherein the dialkyloxystyrene compound is di methoxystyrene, and the pentahalogenostyrene compound is pentafluorostyrene.

(37) A method for preparing a polymer compound of formula P, comprising submitting di methoxystyrene and pentafluorostyrene to a random copolymerization.

(38) A method for preparing a polymer compound of formula P', comprising submitting the polymer compound of formula P to a demethylation process.

(39) A method for preparing the polymer compound as defined in any one of (14) to (26) above, comprising submitting a dialkyloxystyrene compound and a pentahalogenostyrene compound to a polymerization process which is atom transfer radical polymerization (ATRP), atom transfer radical addition polymerization (ATRAP), retarded anionic polymerization (RAP), cationic polymerization or the like.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the Appended Drawings.

DESCRIPTION OF ILLUSTRATIVE EMBODIMENTS

Figure 1:
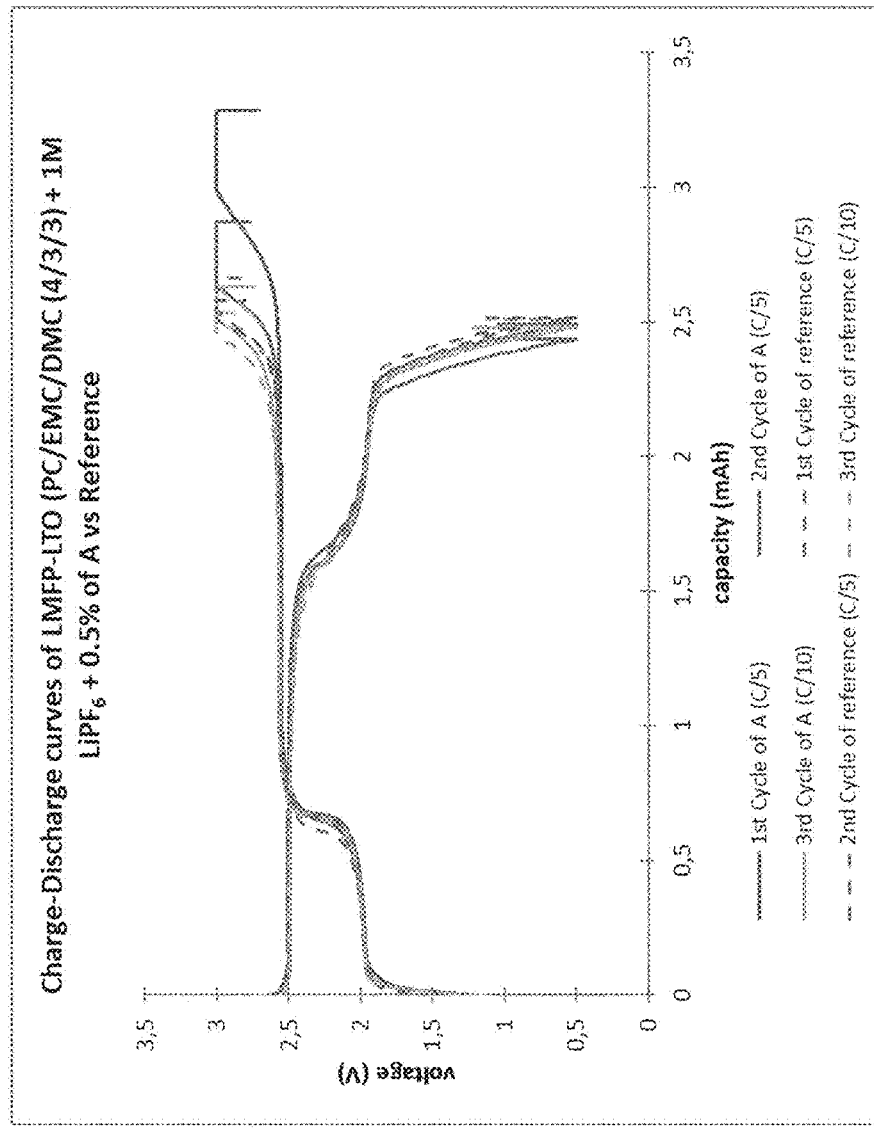
FIG. 1: Charge-Discharge curves of LMFP-LTO battery (PC/EMC/DMC (4/3/3)+1M $LiPF_6$+0.5% additive according to the invention (Compound A)) versus Reference.

Before the present invention is further described, it is to be understood that the invention is not limited to the particular embodiments described below, as variations of these embodiments may be made and still fall within the scope of the appended claims. It is also to be understood that the terminology employed is for the purpose of describing particular embodiments; and is not intended to be limiting. Instead, the scope of the present invention will be established by the appended claims.

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this disclosure pertains.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used herein when referring to numerical values or percentages, the term "about" includes variations due to the methods used to determine the values or percentages, statistical variance and human error. Moreover, each numerical parameter in this application should at least be construed in light of the number of reported significant digits and by applying ordinary rounding techniques.

Term "alkyl" or "alk" as used herein, represents a monovalent group derived from a straight or branched chain saturated hydrocarbon comprising, unless otherwise specified, from 1 to 15 carbon atoms and is exemplified by methyl, ethyl, n- and iso-propyl, n-, sec-, iso- and tert-butyl, neopentyl and the like and may be optionally substituted with one, two, three or, in the case of alkyl groups comprising two carbons or more, four substituents.

The term "alkoxy" or "alkyloxy" as used interchangeably herein, represents an alkyl group attached to the parent molecular group through an oxygen atom.

The term "alkylthio" or "thioalkoxy" as used interchangeably herein, represents an alkyl group attached to the parent molecular group through a sulfur atom.

The term "alkylene" as used herein, represents a saturated divalent hydrocarbon group derived from a straight or branched chain saturated hydrocarbon by the removal of two hydrogen atoms, and is exemplified by methylene, ethylene, isopropylene and the like.

The term "alkenyl" as used herein, represents monovalent straight or branched chain groups of, unless otherwise specified, from 2 to 15 carbons, such as, for example, 2 to 6 carbon atoms or 2 to 4 carbon atoms, containing one or more carbon-carbon double bonds and is exemplified by ethenyl, 1-propenyl, 2-propenyl, 2-methyl-1-propenyl, 1-butenyl, 2-butenyl and the like and may be optionally substituted with one, two, three or four substituents.

The term "alkynyl" as used herein, represents monovalent straight or branched chain groups of from two to six carbon atoms comprising a carbon-carbon triple bond and is exemplified by ethynyl, 1-propynyl, and the like and may be optionally substituted with one, two, three or four substituents.

The term "cycloalkyl" as used herein, represents a monovalent saturated or unsaturated non-aromatic cyclic hydrocarbon group of three to eight carbon atoms, unless otherwise specified, and is exemplified by cyclopropyl, cyclobutyl, cyclopentyl, cyclohexyl, cycloheptyl, bicyclo[2.2.1]heptyl and the like.

The term "halogen" or "halo" as used interchangeably herein, represents F, Cl, Br and I.

The term "heteroatom", as used herein, is understood as being oxygen, sulfur or nitrogen.

The inventors have designed and prepared an additive for use in association with the electrolyte in a Li-ion battery comprising a metal-based cathode material capable of producing $M^{2+}$ metal ions. The additive of the invention is added to the electrolyte; and allows for the prevention of the $M^{2+}$ ions dissolution.

More specifically, the additive of the invention for use in association with the electrolyte is a small organic molecule as described herein and having general formulae I-V. Such small organic compounds are exemplified by Compounds A-D. The small organic compound comprises at least one chemical group suitable for forming complexes with the $M^{2+}$ metal ions. Such chemical group are apparent to a skilled person. Also, the small organic compound is compatible with the electrolyte as well as other components of the battery.

Also, the inventors have designed and prepared an additive (binder) for use in association with the cathode material in a Li-ion battery comprising a metal-based cathode material capable of producing $M^{2+}$ metal ions. The additive according to this aspect of the invention is a binder. The binder is mixed with the cathode material; and allows for the prevention of the $M^{2+}$ ions dissolution.

More specifically, the additive or binder of the invention for use in association with the cathode material is a polymer compound as described below and having general formulae VI-IX. Such polymer compounds are exemplified by Polymer P and Polymer P'. The polymer compound comprises at least one chemical group suitable for forming complexes with the $M^{2+}$ metal ions. Such chemical group are apparent to a skilled person. Also, the polymer compound is compatible with the cathode active material as well as other components of the battery.

The present invention is illustrated in further details by the following non-limiting examples.

Small Organic Molecule for Use as Additive in Association with the Electrolyte

Example 1— Preparation of Compound A: 3,4-dimethoxybenzaldehyde (1 equivalent) and malanonitrile (1.5 equivalent) were solubilized in chloroform. Under stirring, 3 drops of trimethylamine were added. After 1 night at 60° C., the solvent was evaporated. The crude was washed with water 3 times and extracted by dichloromethane. The organic phases were dried with $MgSO_4$ and the solvent evaporated. The orange solid was purified by gel chromatography (eluent: hexanes:dichloromethane (80:20)) to give light yellow solid (70%).

Compound B, Compound C and Compound D are commercially available and were used as received.

Polymer Compound for Use as Additive (Binder) in Association with the Cathode Material The polymer compound according to the invention is obtained from pentafluorostyrene and dimethoxystyrene as outlined in Scheme 1 below. Pentafluorostyrene allows for a good compatibility with PVDF and a good electrochemical stability. The level of incorporation of dimethoxystyrene in the polymer according to the invention is around 40 mol % or higher. In this regard, Polymer dimethoxy-1 (polymer comprising 48 mol % of dimethoxystyrene moieties), Polymer dimethoxy-2 (polymer comprising 70 mol % of dimethoxystyrene moieties) and Polymer dimethoxy-3 (polymer comprising 100 mol % of dimethoxystyrene moieties) were prepared as outlined at Example 2 below. The preparation is generally based on a random copolymerization of dimethoxystyrene (DMSt) and pentafluorostyrene (PFS). Dimethoxystyrene forms a complex with the metals ions including $Mn^{2+}$ ions, therefore limiting their diffusion throughout the electrolyte, and thus their deposition on the anode side.

Scheme 1

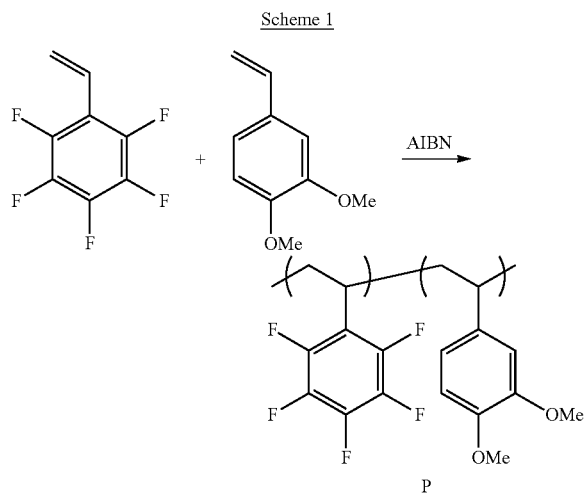

The polymer compound of the invention with free hydroxy groups (polymer comprising dihydroxystyrene moieties) is obtained as outlined in Scheme 2. In this regard, Polymer dihydroxy-1 (polymer comprising 50 mol % of dihydroxystyrene moieties) was prepared.

Scheme 2

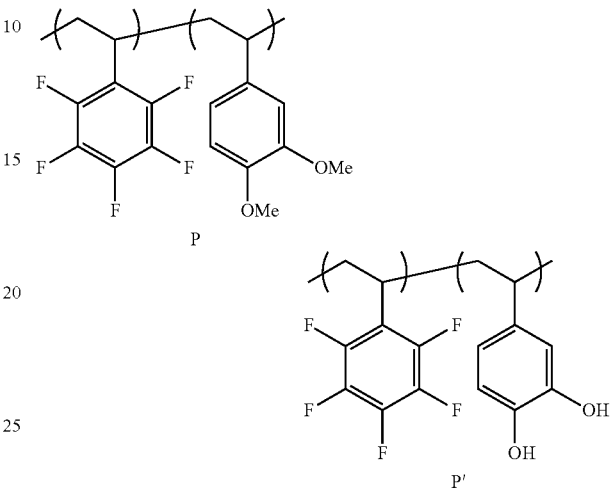

Example 2— Preparation of Polymer dimethoxy-1: DMSt and PFS were first passed through basic aluminum oxide (alumina, $Al_2O_3$). Polymerization was achieved by introducing 50 mL of dioxane, 3.2 g of DMSt and 3.7 g of PFS into a 100 mL round bottom flask. The solution was then stirred with a magnetic bar for 30 minutes and bubbled with nitrogen ($N_2$). 80 mg of AIBN was then added to the obtained solution. A condenser was then attached to the round bottom flask and the reaction mixture was heated at 80° C. for 12 hours under $N_2$. The resulting solution was then cooled down to room temperature and poured in 10 volumes of methanol. The supernatant was separated from the precipitated polymer, which was then dried under vacuum at 60° C. for 12 hours. Yield=4.1 g, 48 mol % in DMSt, $M_n$=26 000 g/mol, PDI=1.7.

As will be understood by a skilled person, Polymer dimethoxy-2 and Polymer dimethoxy-3 are prepared by the same procedure described in Example 2.

Example 3— Preparation of a polymer comprising dihydroxystyrene moieties (Polymer dihydroxy-1): Polymer dimethoxy-2 or 3 obtained in Example 2 was subjected to hydrolysis according to a method described by Westwood et al. [6], 0.50 g of Polymer dimethoxy-2 or 3 and 4.3 mL of BBr 3 in DCM 1.0M were used.

Example 4— Preparation of the cathode material according to the invention: the hybrid cathode pastes were prepared by mechanically mixing (thinky Mixer SR-500) of additives if present, active material, acetylene black (Denka HS-100L), carbon fiber (VGCF-SDH-HC) and PVDF (130 mg/mol) in NMP. The resulting viscous slurry was cast by the doctor Blade method uniformly onto an aluminum foil serving as a current collector, dried at 80° C. under vacuum and roll-pressed with Rolling Machine (MSK-2150) at 63 µm to achieve an electrode active layer density 8.5 mg/cm 2. Electrodes were further dried under vacuum at 150° C. before use.

As will be understood by a skilled person, the polymer according to the invention may be prepared by different polymerization processes, such processes include but are not limited to atom transfer radical polymerization (ATRP), atom transfer radical addition polymerization (ATRAP), retarded anionic polymerization (RAP), cationic polymerization or the like.

Figure 2:
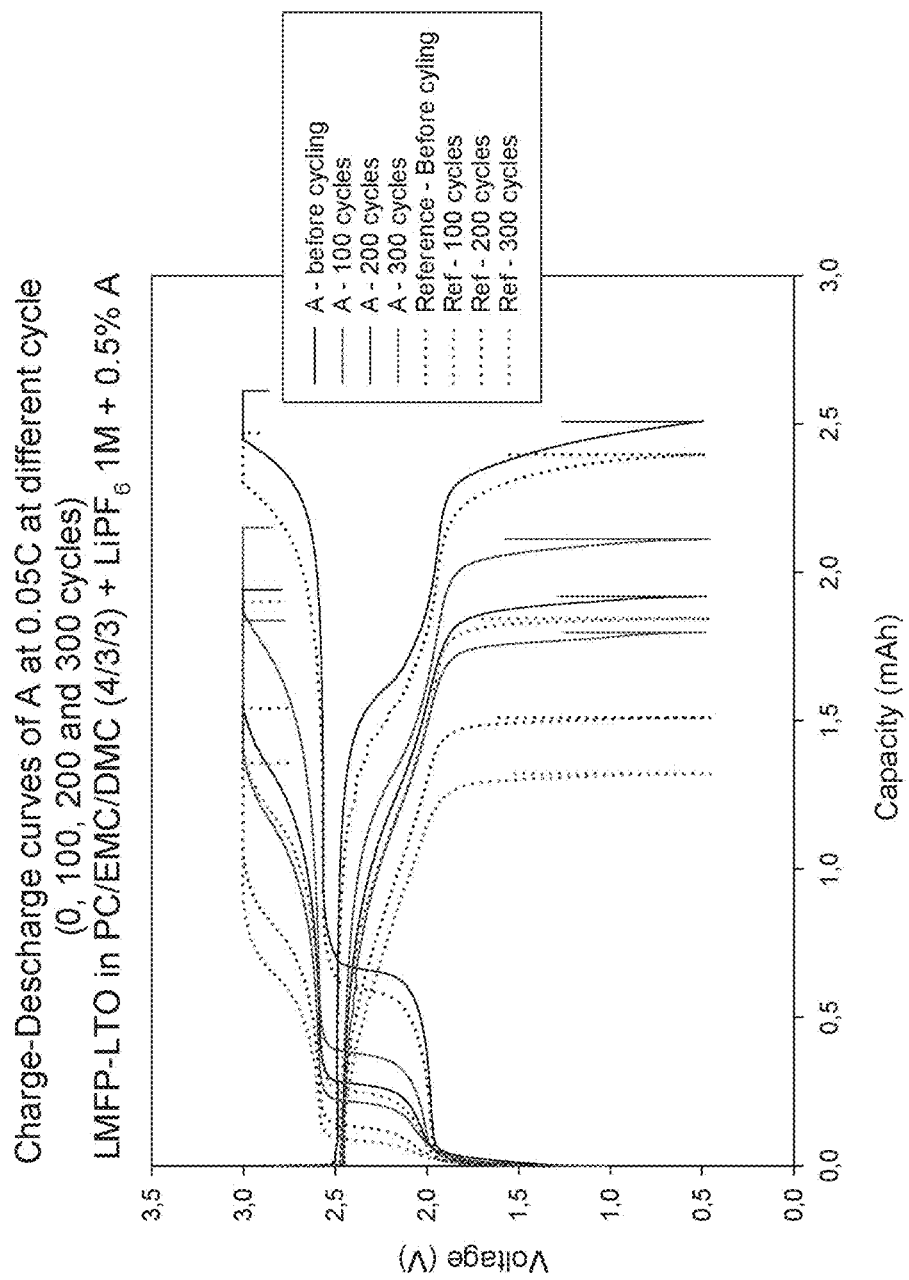
FIG. 2: Charge-Discharge curves of LMFP-LTO battery (PC/EMC/DMC (4/3/3)+1M $LiPF_6$+0.5% additive according to the invention (Compound A)) versus Reference, at 0.05 C at various cycles (0, 100, 200 and 300 cycles).

Referring to the figures, FIGS. 1-4 outline results obtained using Compound A as additive in the electrolyte. As can be seen in FIG. 2, at the beginning of the cycling process, metals ions dissolution decreases, and this continues during the whole cycling process. Indeed, the plateau related to the metals for the Reference decreases, and the phenomenon is less important for the battery according to the invention, namely, the battery wherein the electrolyte comprises Compound A as additive. Moreover, during the cycling process, the internal resistance of the battery according to the invention remains the same as in the Reference, whereas the resistance associated to charge transfer decreases significantly.

Figure 3:
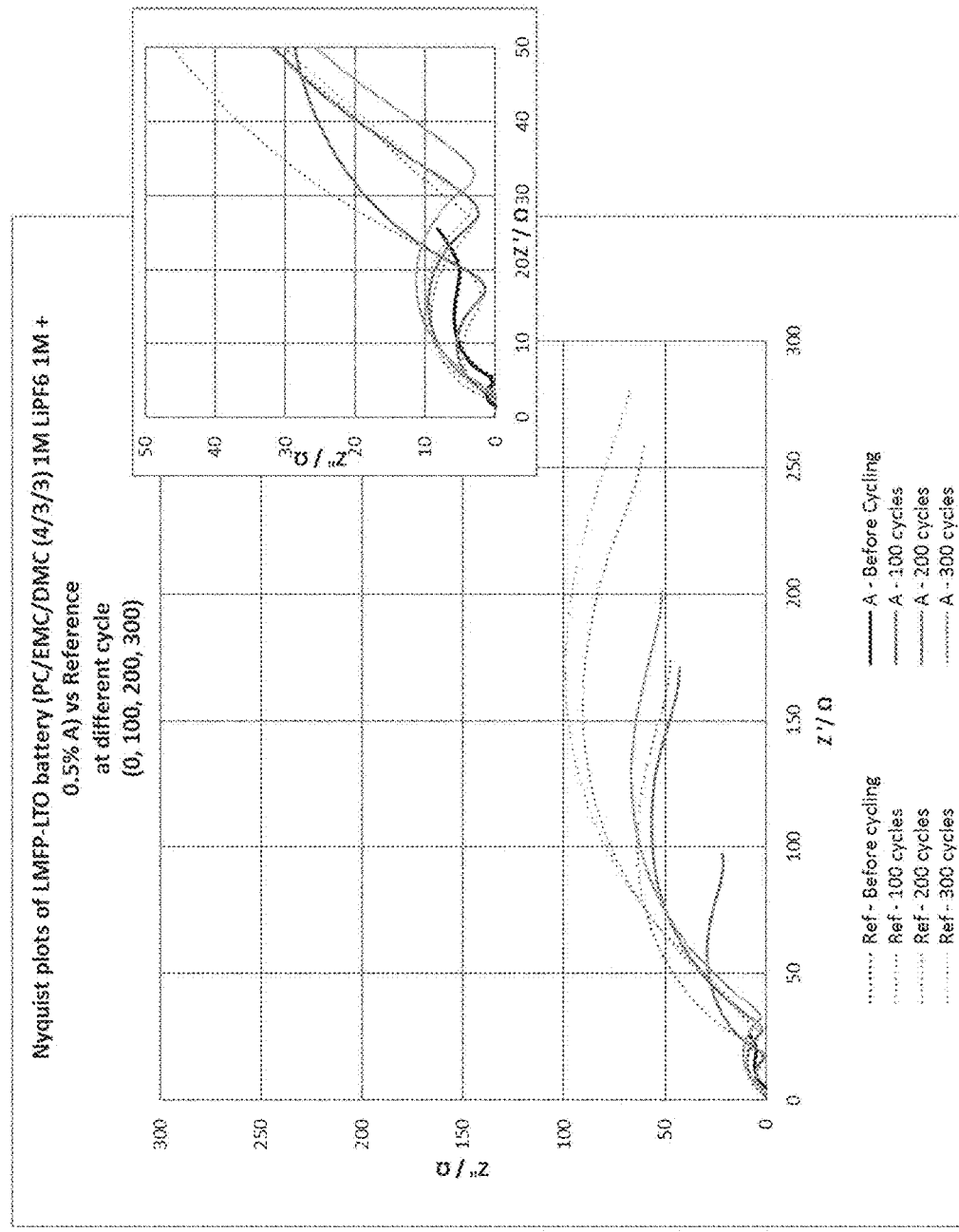
FIG. 3: Nyquist plots of LMFP-LTO battery (PC/EMC/DMC (4/3/3)+1M $LiPF_6$+0.5% additive according to the invention (Compound A)) versus Reference, at various cycles (0, 100, 200 and 300 cycles).
Figure 4:
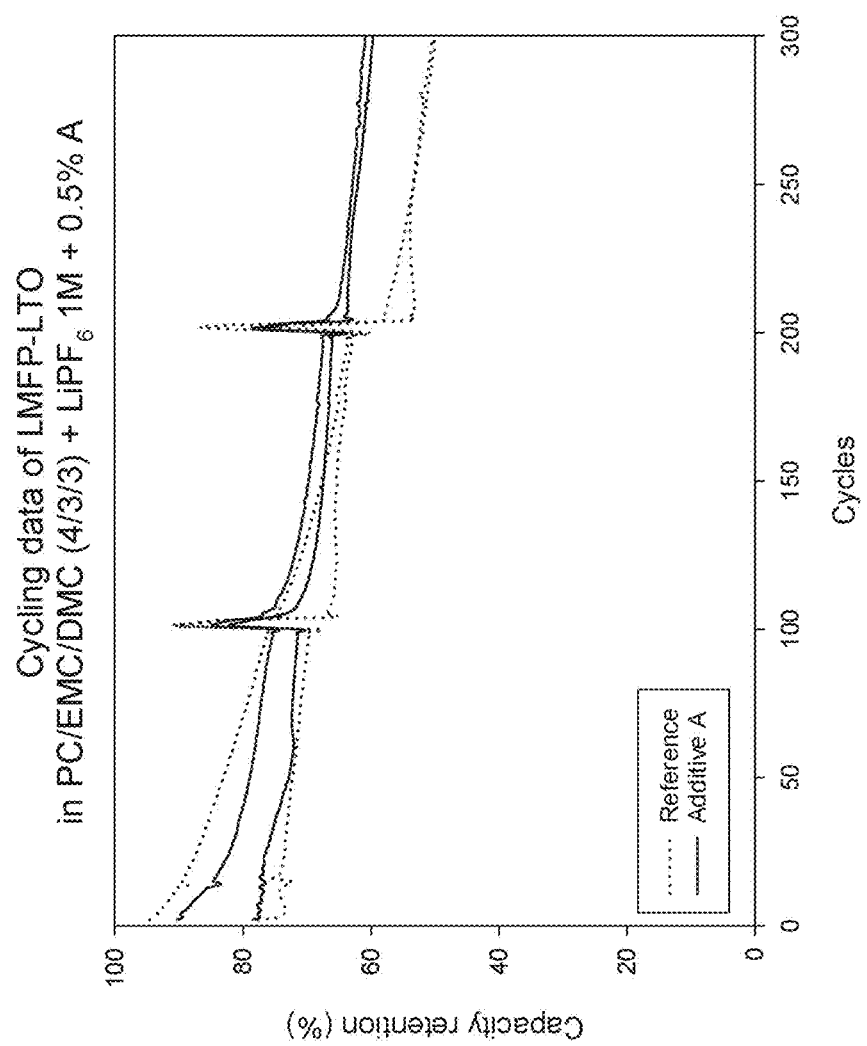
FIG. 4: Cycling data of LMFP-LTO battery (PC/EMC/DMC (4/3/3)+1M $LiPF_6$+0.5% additive according to the invention (Compound A)) versus Reference after 300 cycles at 45° C.
Figure 5:
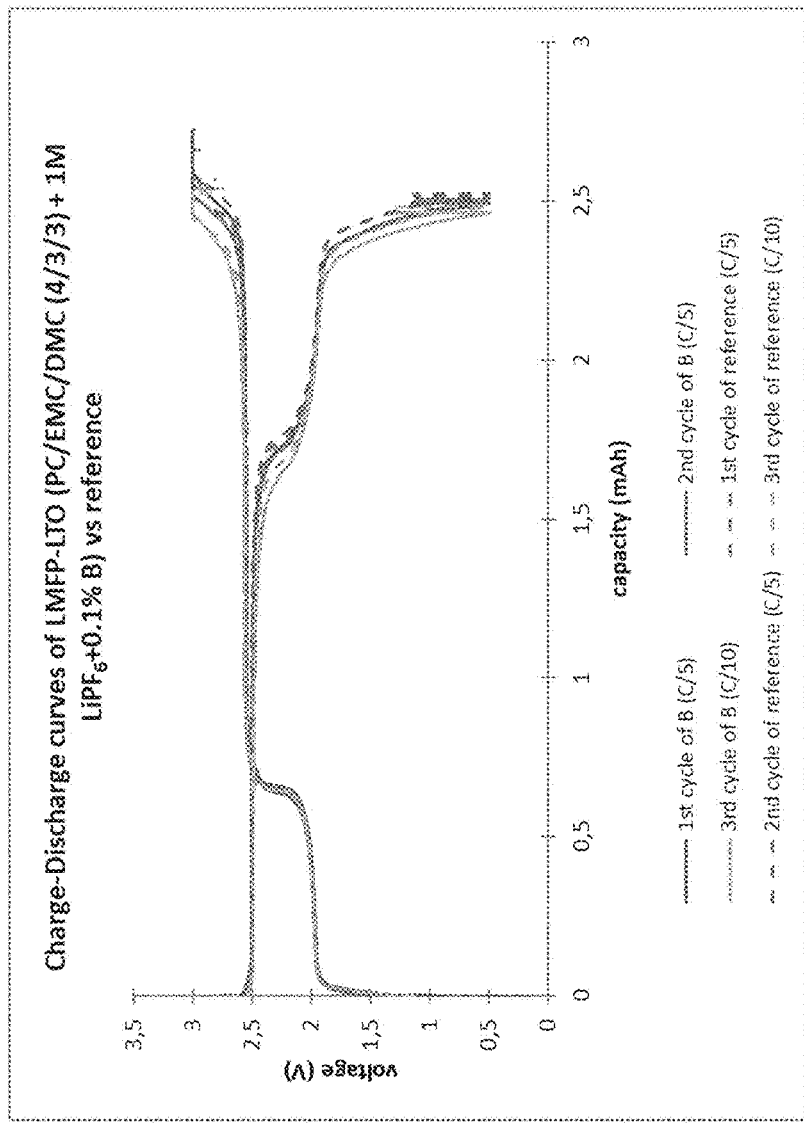
FIG. 5: Charge-Discharge curves of LMFP-LTO battery (PC/EMC/DMC (4/3/3)+1M $LiPF_6$+0.1% additive according to the invention (Compound B)) versus Reference.
Figure 6:
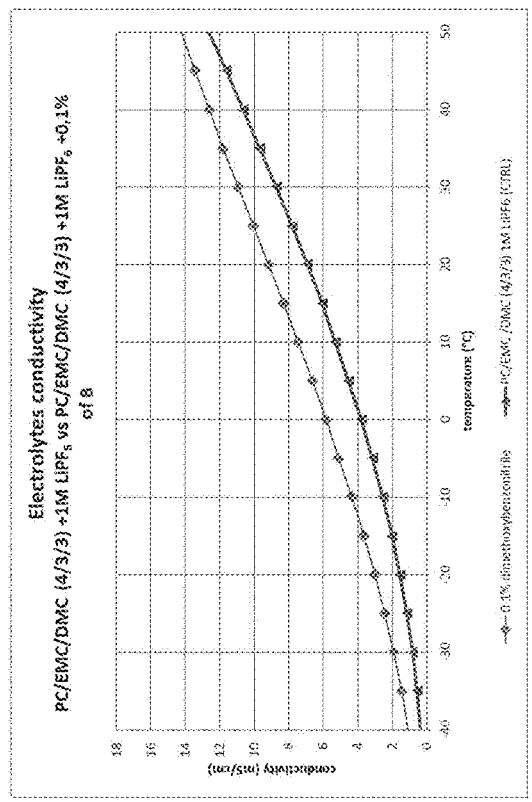
FIG. 6: Conductivities of electrolytes, PC/EMC/DMC (4/3/3)+1M $LiPF_6$ versus PC/EMC/DMC (4/3/3)+1M $LiPF_6$+0.1% of additive according to the invention (Compound B).

As can be seen in FIG. 3 and FIG. 4, after 300 cycles at 10 and 45° C., the retention capacity of the battery comprising 0.5% of Compound A as additive is 61%, whereas it is 50% for the Reference. After 300 cycles, the static capacity at 0.05 C of the battery according to the invention is 1.80 mAh, whereas it is 1.30 mAh for the Reference.

Compound B was also used as additive in the electrolyte. The results obtained are outlined in FIGS. 5-8. The capacity at 0.2 C of the battery LMF/LTO with 0.1% of Compound B as additive is 2.48 mAh, the same as in the Reference. As can be seen, the use of 0.1% of Compound B as additive improves the conductivity and enhances the performances of the battery at various C-rates. It can also be seen that metals ions dissolution decreases right at the beginning of the cycling process.

Figure 7:
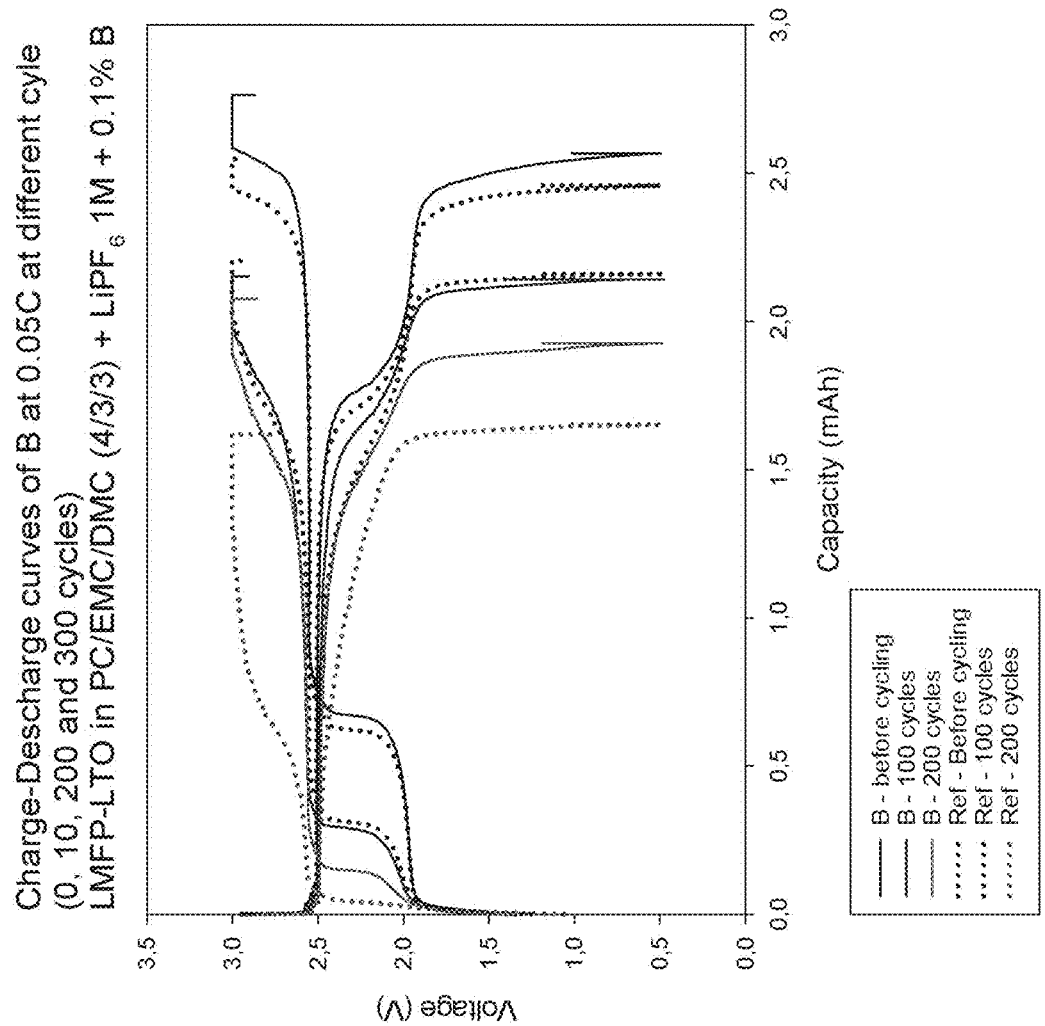
FIG. 7: Charge-Discharge curves of LMFP-LTO battery (PC/EMC/DMC (4/3/3)+1M $LiPF_6$+0.1% additive according to the invention (Compound B)) versus Reference, at 0.05 C at various cycles (0, 100 and 200).
Figure 8:
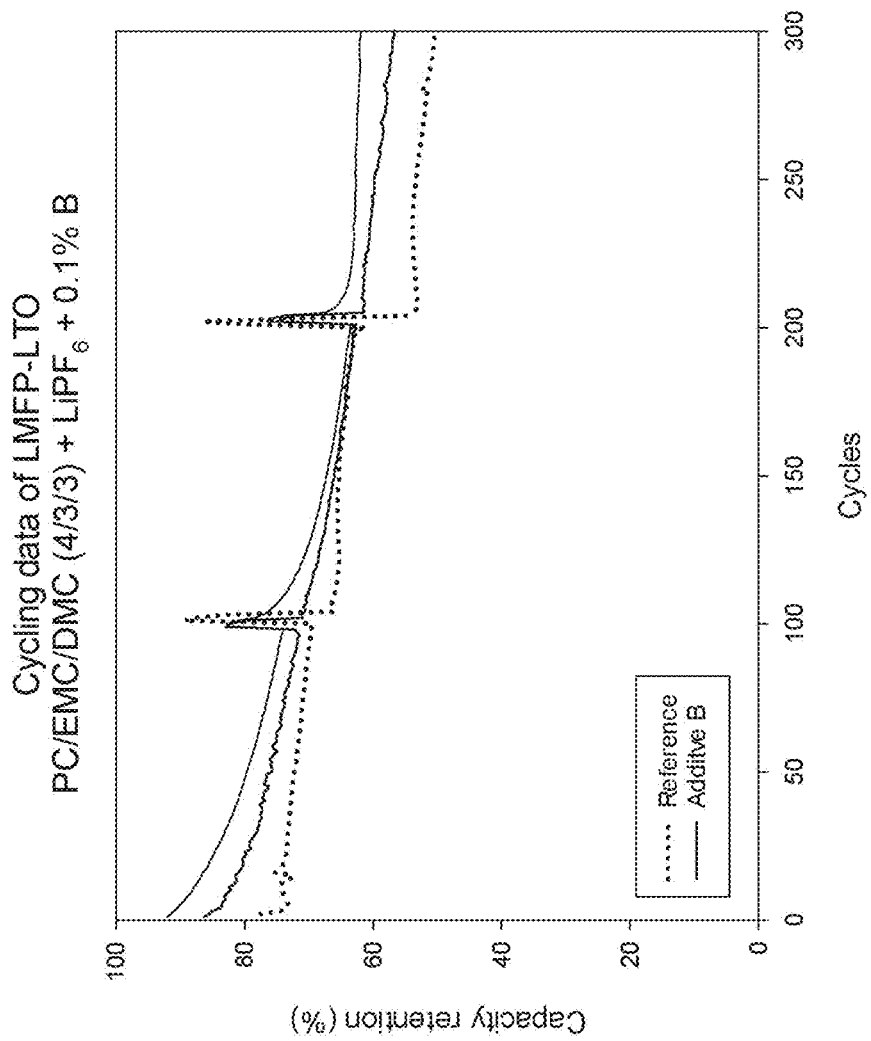
FIG. 8: Cycling data of LMFP-LTO battery (PC/EMC/DMC (4/3/3)+1M $LiPF_6$+0.1% additive according to the invention (Compound B)) versus Reference after 303 cycles at 45° C.

As can be seen in FIG. 7 and FIG. 8, after 300 cycles at 10 and 45° C., the retention capacity of the battery comprising 0.1% of Compound B as additive is 62%, whereas it is 50% for the Reference. After 300 cycles, the static capacity at 0.05 C of the battery according to the invention is 1.92 mAh, whereas it is 1.64 mAh for the Reference.

Figure 9:
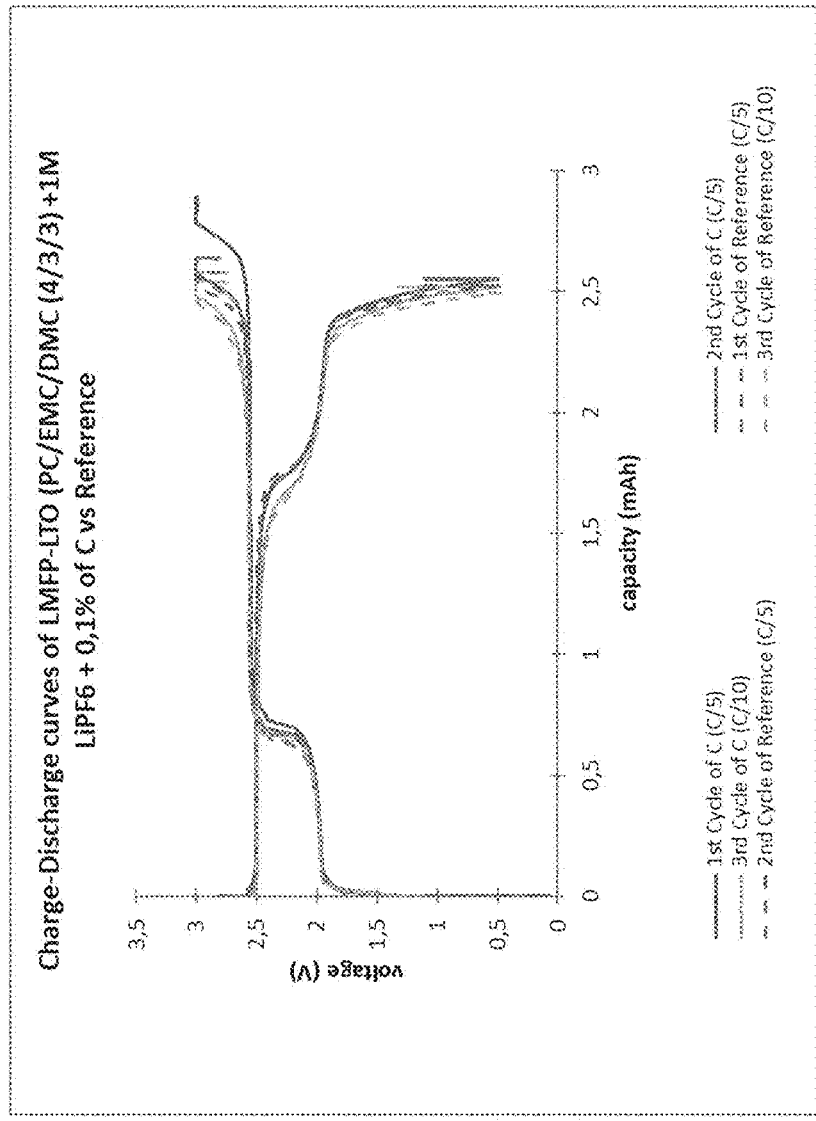
FIG. 9: Charge-Discharge curves of LMFP-LTO battery (PC/EMC/DMC (4/3/3)+1M $LiPF_6$+0.1% additive according to the invention (Compound C)) versus Reference.
Figure 10:
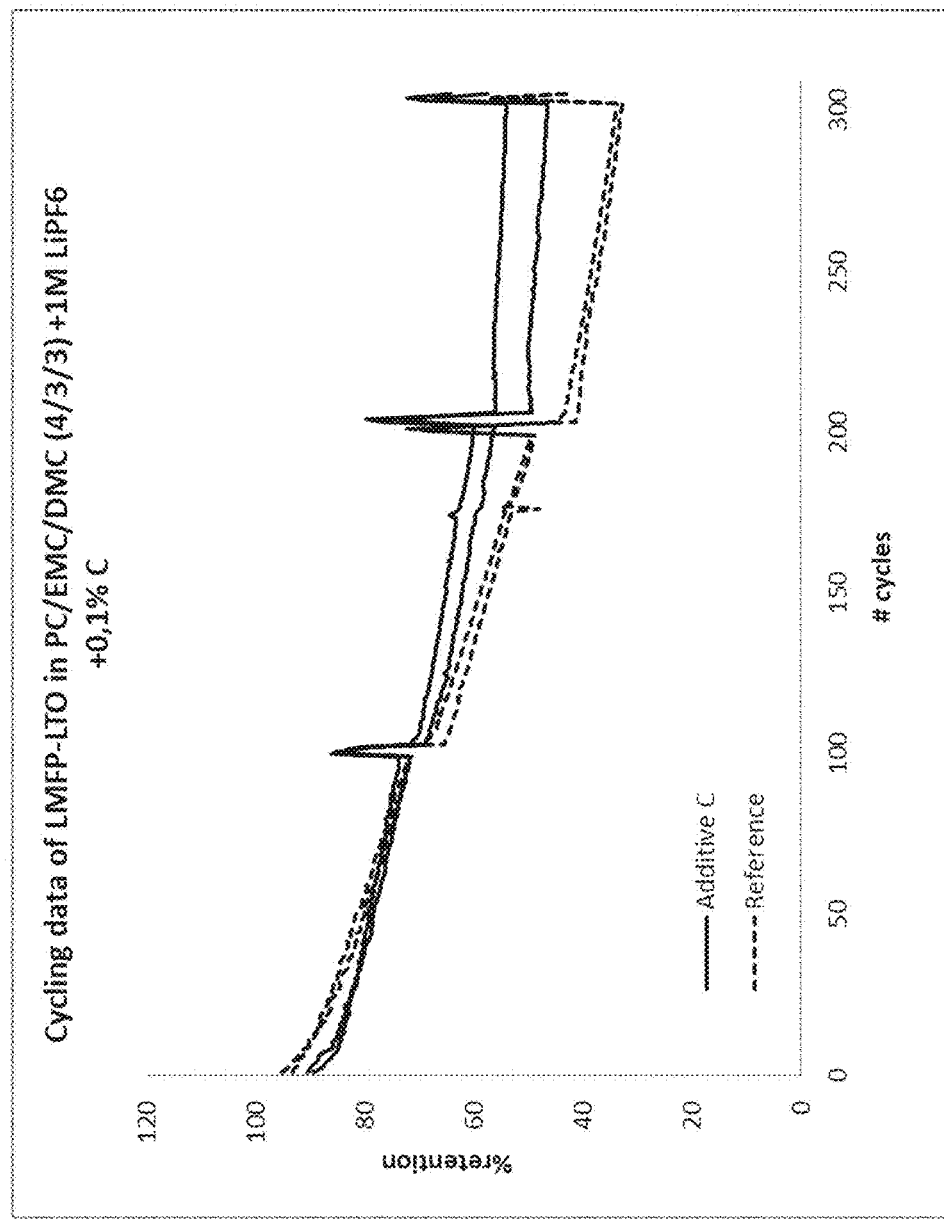
FIG. 10: Cycling data of LMFP-LTO battery (PC/EMC/DMC (4/3/3)+1M $LiPF_6$+0.1% additive according to the invention (Compound C)) versus Reference after 300 cycles at 45° C.
Figure 11:
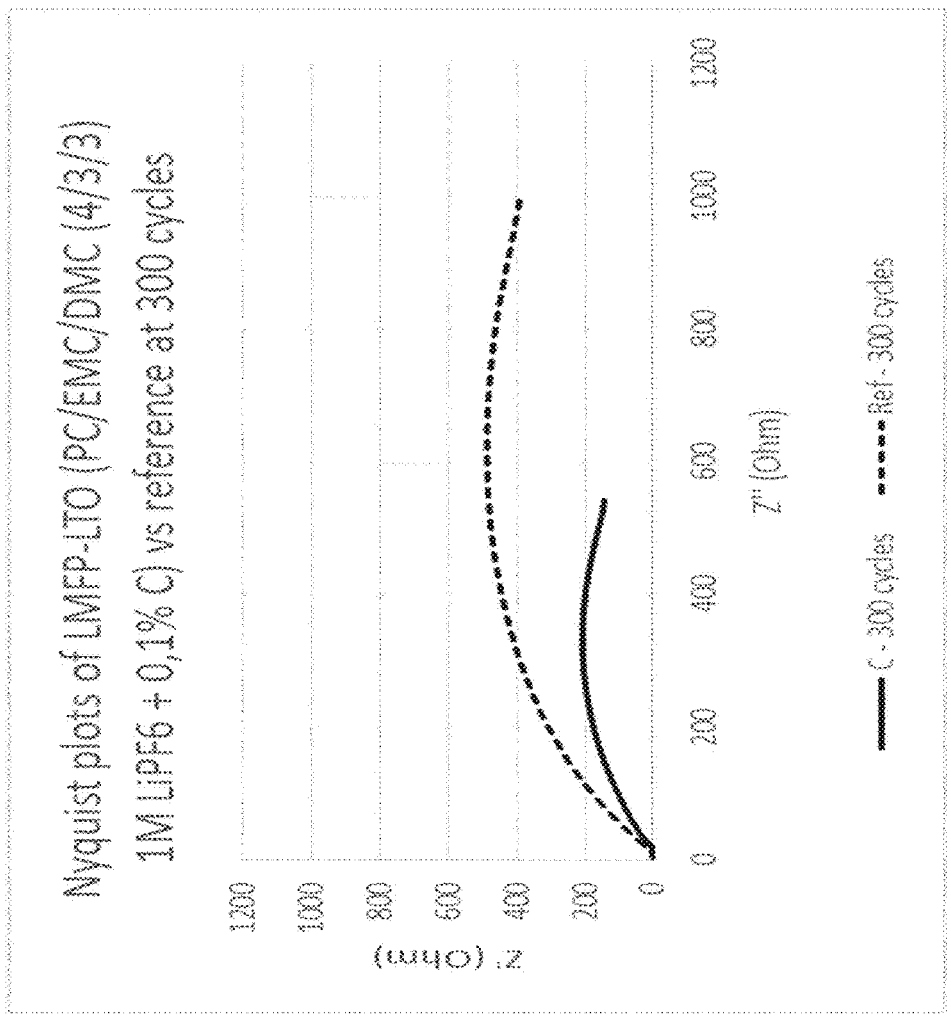
FIG. 11: Nyquist plots of LMFP-LTO battery (PC/EMC/DMC (4/3/3)+1M $LiPF_6$+0.1% additive according to the invention (Compound C)) versus Reference, at 300 cycles.
Figure 12:
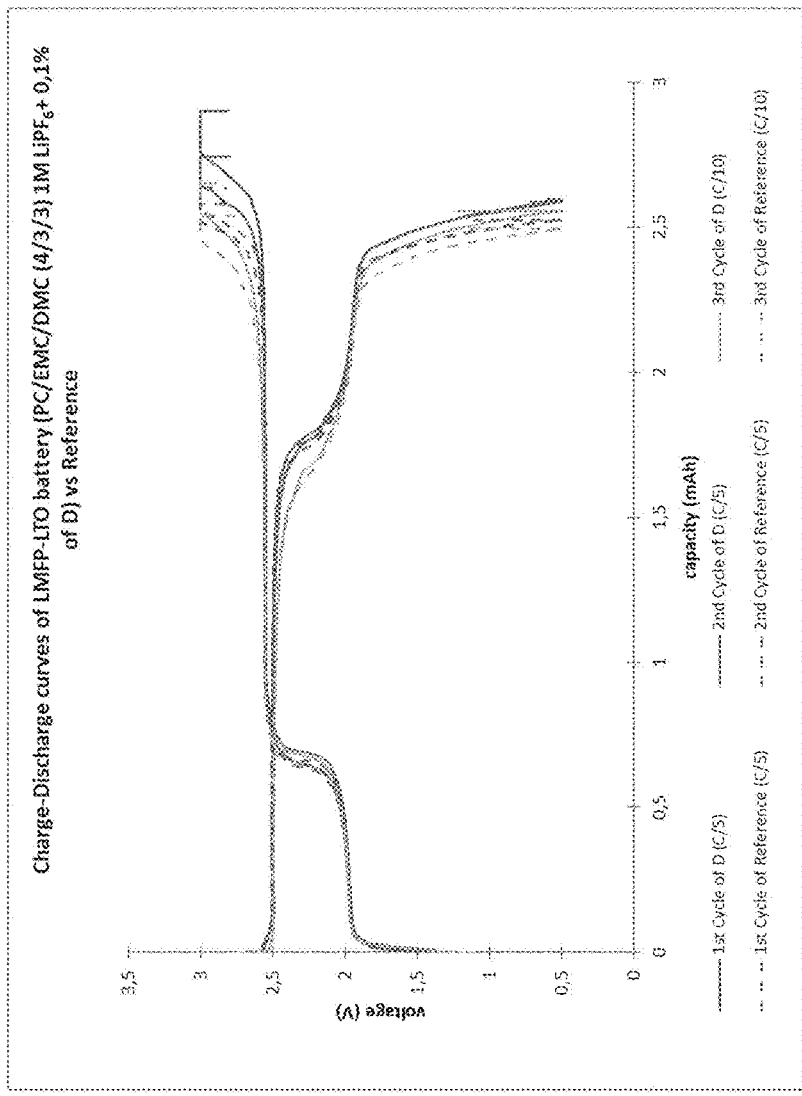
FIG. 12: Charge-Discharge curves of LMFP-LTO battery (PC/EMC/DMC (4/3/3)+1M $LiPF_6$+0.1% additive according to the invention (Compound D)) versus Reference.
Figure 13:
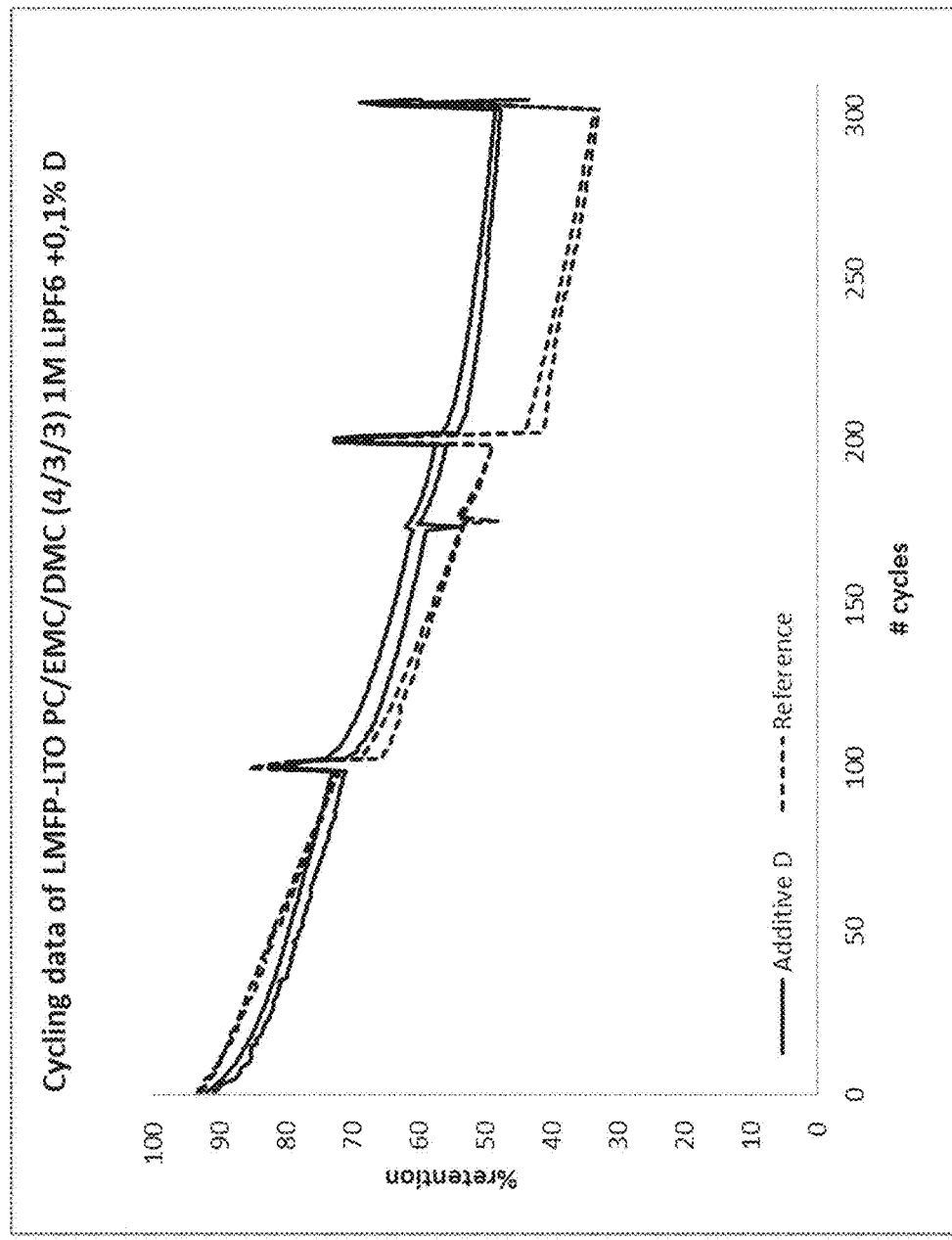
FIG. 13: Cycling data of LMFP-LTO battery (PC/EMC/DMC (4/3/3)+1M $LiPF_6$+0.1% additive according to the invention (Compound D)) versus Reference after 300 cycles at 45° C.
Figure 14:
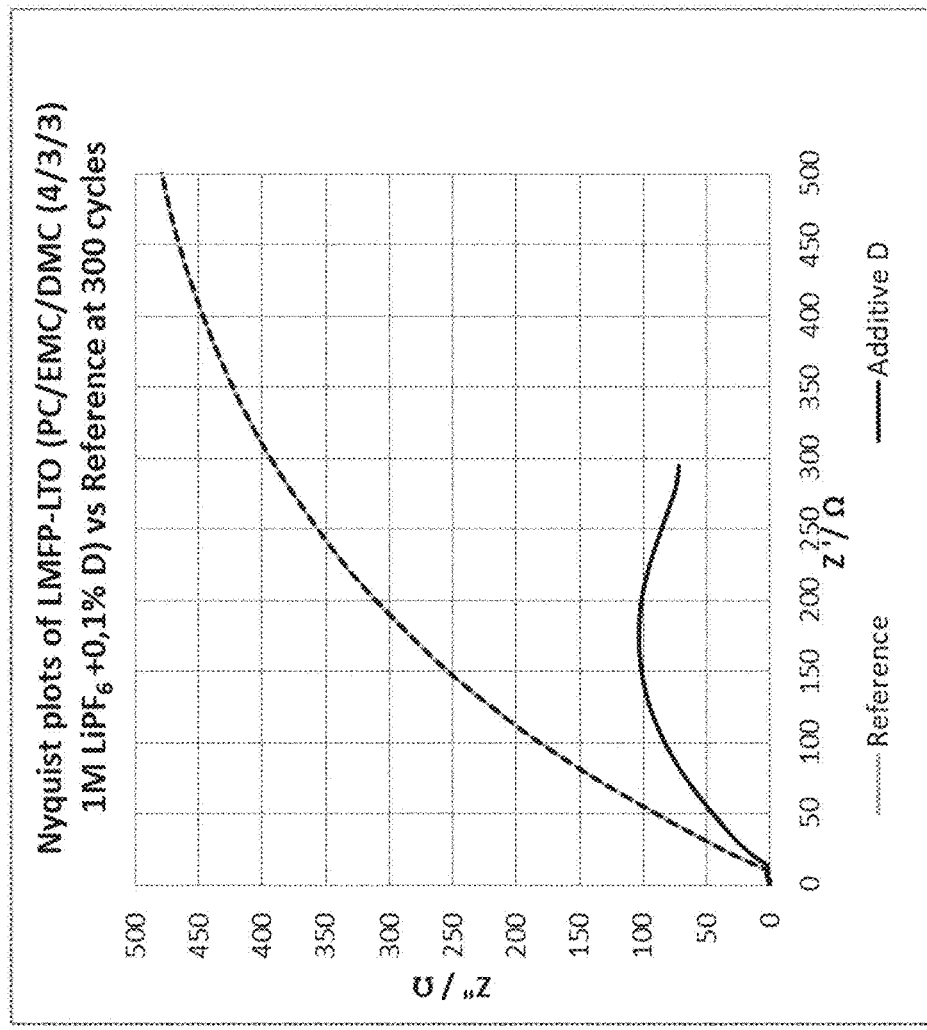
FIG. 14: Nyquist plots of LMFP-LTO battery (PC/EMC/DMC (4/3/3)+1M $LiPF_6$+0.1% additive according to the invention (Compound D)) versus Reference, at 300 cycles.
Figure 15:
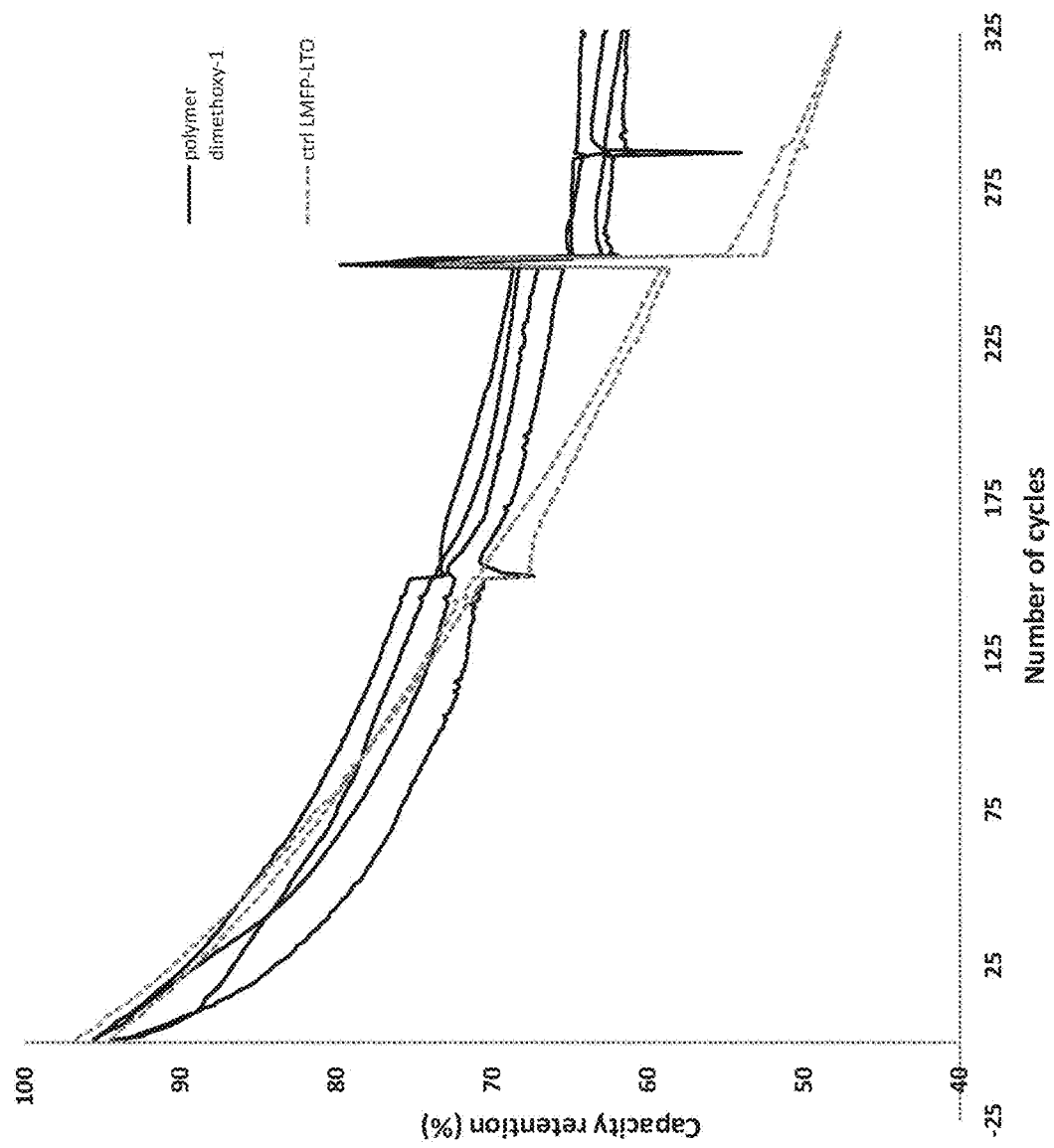
FIG. 15: Cycling data of (LMFP+4% PVDF+1% additive (binder) according to the invention (polymer comprising 48 mol % dimethoxystyrene moieties or "Polymer dimethoxy-1")-LTO-PC/EMC/DMC (4/3/3)+1M $LiPF_6$+1% VC) battery versus Reference (LMFP+5% PVDF-LTO-PC/EMC/DMC (4/3/3)+1M $LiPF_6$+1% VC) after 325 cycles at 45° C.
Figure 16:
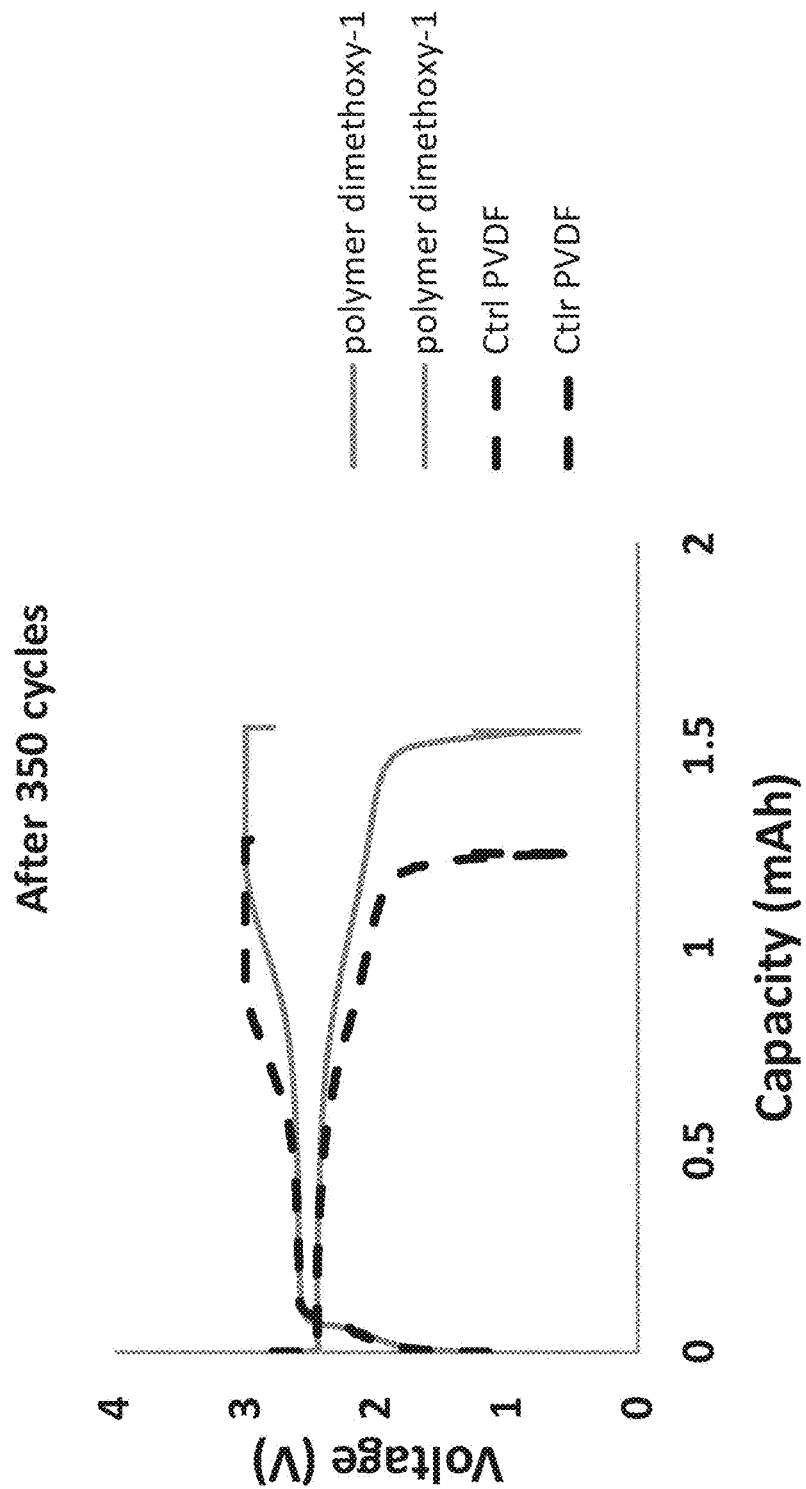
FIG. 16: Charge-Discharge curves of (LMFP+4% PVDF+1% additive (binder) according to the invention (polymer comprising 48 mol % dimethoxystyrene moieties or "Polymer dimethoxy-1")-LTO-PC/EMC/DMC (4/3/3)+1M $LiPF_6$+1% VC) battery versus Reference (LMFP+5% PVDF-LTO-PC/EMC/DMC (4/3/3)+1M $LiPF_6$+1% VC).
Figure 17:
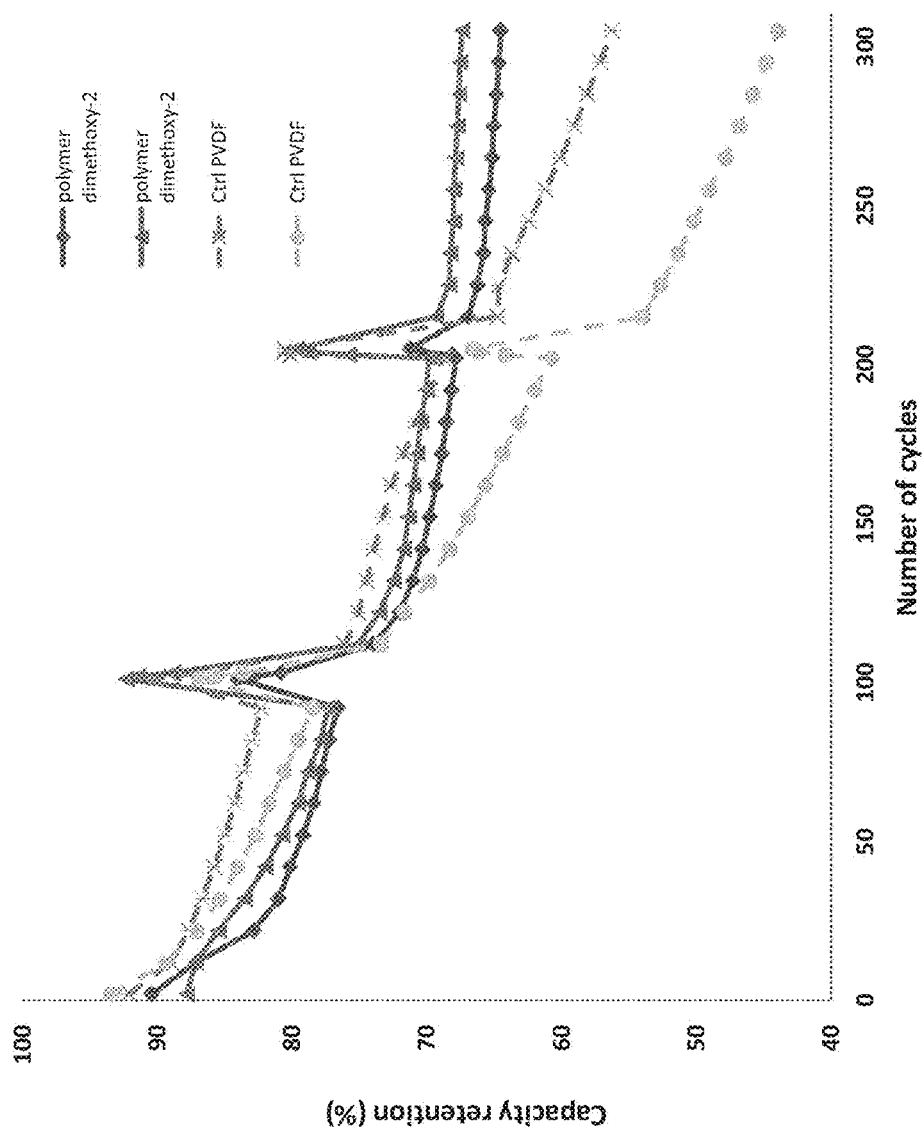
FIG. 17: Cycling data of (LMFP+4% PVDF+1% additive (binder) according to the invention (polymer comprising 70 mol % dimethoxystyrene moieties or "Polymer dimethoxy-2")-LTO-PC/EMC/DMC (4/3/3)+1M $LiPF_6$+1% VC) battery versus Reference (LMFP+4% PVDF-LTO-PC/EMC/DMC (4/3/3)+1M $LiPF_6$+1% VC), after 300 cycles at 45° C.

Compound C and Compound D were also used as additive in the electrolyte. The results obtained are outlined in FIGS. 9-14. Referring to FIG. 9, although a secondary reaction is observed, the capacity obtained is similar to the one obtained for the Reference. As can be seen in FIG. 12, a secondary reaction is observed, which leads to a slight irreversibility. Nonetheless, the capacity obtained is similar to the one obtained for the Reference.

Referring to FIGS. 15-18, the capacity for LMFP (4% PVDF, 1% Polymer dimethoxy-1, 2 or 3-LTO at 0.2 C is 2.23 mAh, while the capacity is 2.35 mAh for the LMFP (5% PVDF)-LTO. After 350 cycles at 45° C. and 10, the retention capacity of 61.9% with 1% of additive while the control is at 45.9%. Moreover, static capacities (0.2 C) are 1.53 and 1.23 mAh after 350 cycles, respectively. Also, voltage fading is reduced after 350 cycles (FIG. 16); the capacity of the Reference is 1.23 mAh, the capacity of the battery according to the invention is 1.53 mAh.

Figure 18:
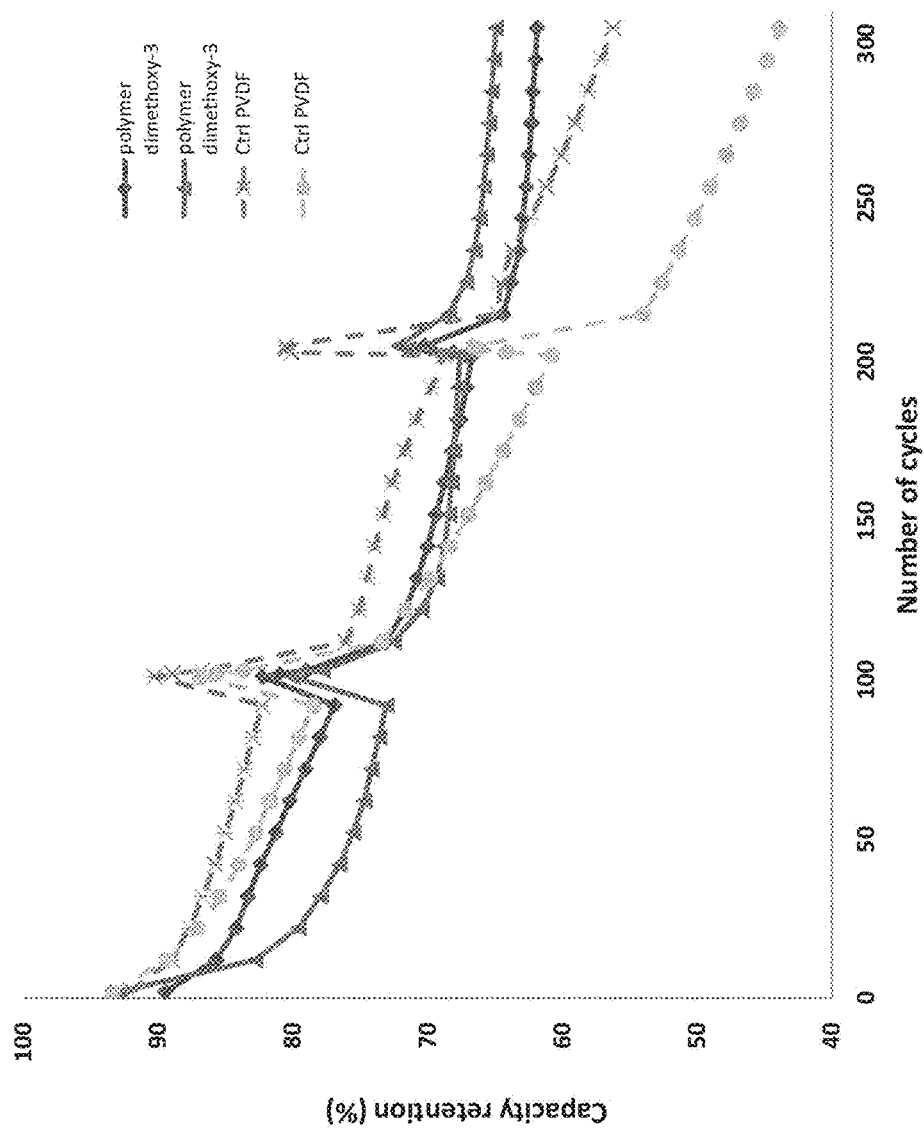
FIG. 18: Cycling data of (LMFP+4% PVDF+1% additive (binder) according to the invention (polymer comprising 100 mol % dimethoxystyrene moieties or "Polymer dimethoxy-3")-LTO-PC/EMC/DMC (4/3/3)+1M $LiPF_6$+1% VC) battery versus Reference (LMFP+4% PVDF-LTO-PC/EMC/DMC (4/3/3)+1M $LiPF_6$+1% VC), after 300 cycles at 45° C.
Figure 19:
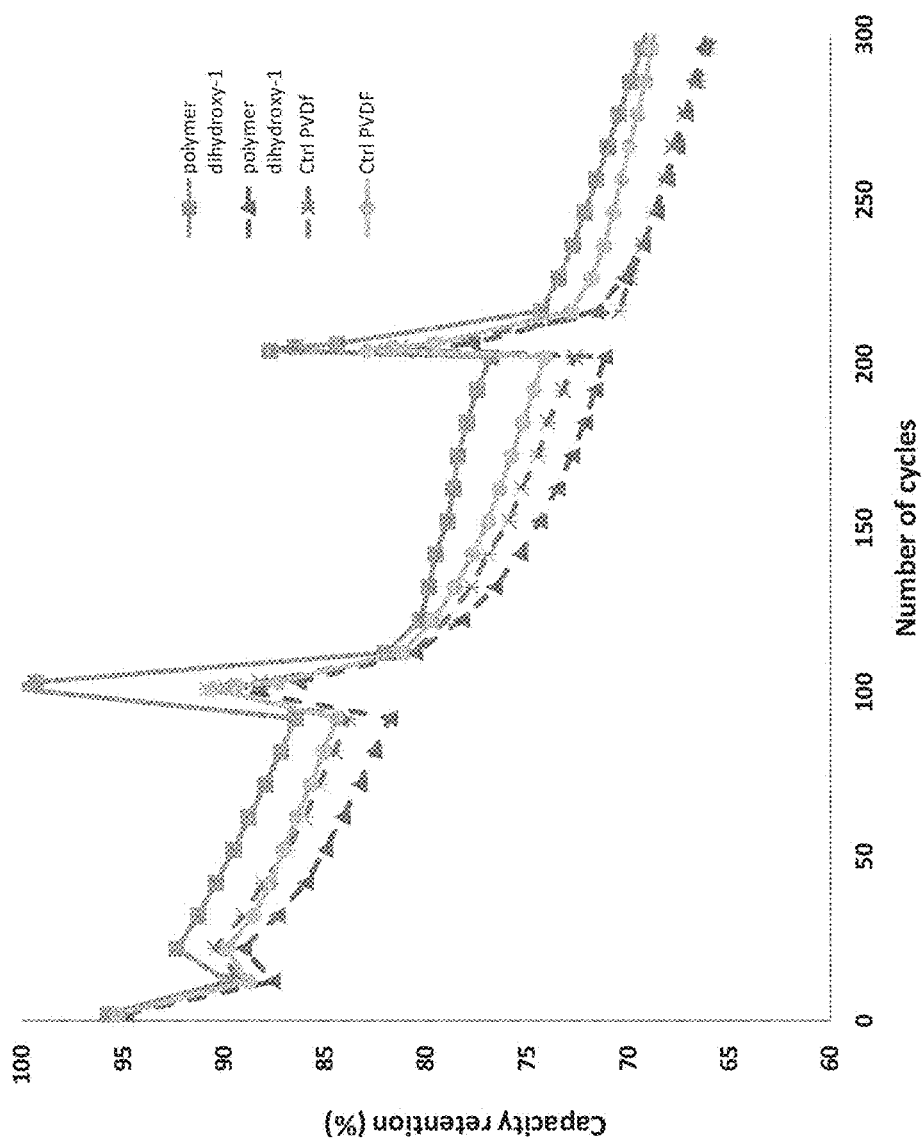
FIG. 19: Cycling data of (LMFP+4% PVDF+1% additive (binder) according to the invention (polymer comprising 50 mol % dihydroxystyrene moieties or "Polymer dihydroxy-1")-LTO-PC/EMC/DMC (4/3/3)+1M LiPF$_6$+1% VC) battery versus Reference (LMFP+4% PVDF-LTO-PC/EMC/DMC (4/3/3)+1M LiPF$_6$+1% VC), after 300 cycles at 45° C.
Figure 20:
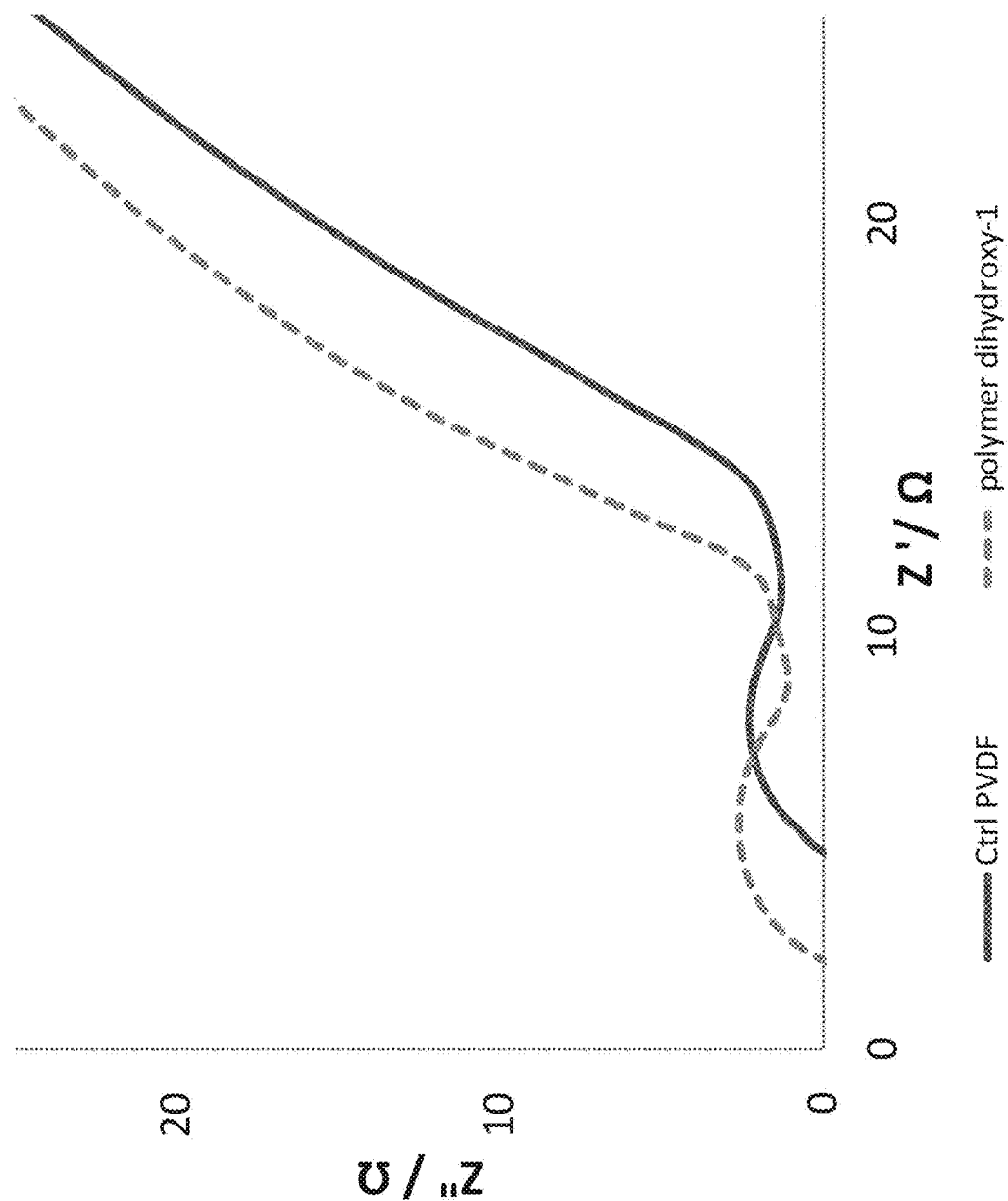
FIG. 20: Nyquist plots of (LMFP+4% PVDF+1% additive (binder) according to the invention (polymer comprising 50 mol % dihydroxystyrene moieties or "Polymer dihydroxy-1")-LTO-PC/EMC/DMC (4/3/3)+1M LiPF$_6$+1% VC) battery versus Reference (LMFP+4% PVDF-LTO-PC/EMC/DMC (4/3/3)+1M LiPF$_6$+1% VC).
Figure 21A:
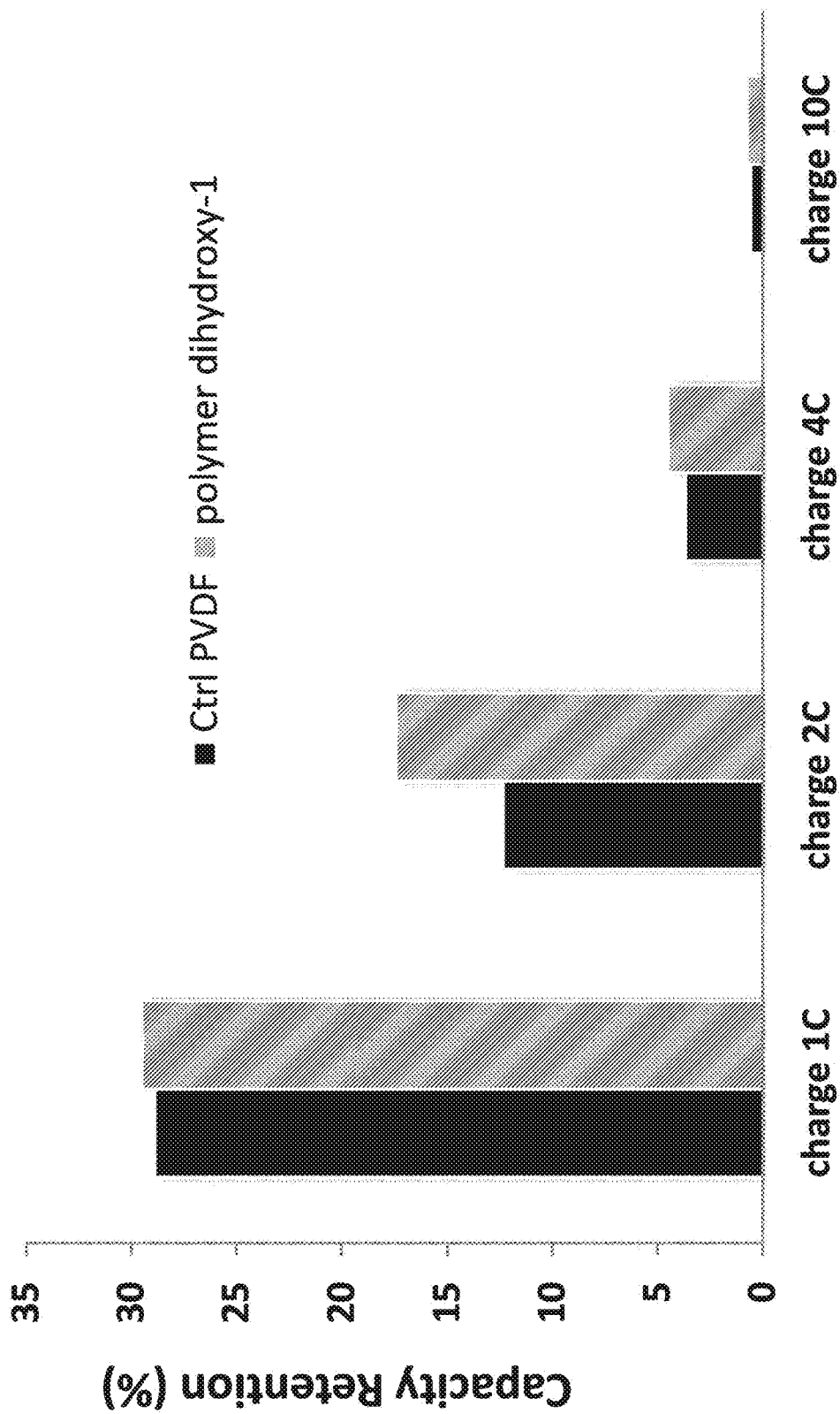
FIG. 21: Capacities of (LMFP+4% PVDF+1% additive (binder) according to the invention (polymer comprising 50 mol % dihydroxystyrene moieties or "Polymer dihydroxy-1")-LTO-PC/EMC/DMC (4/3/3)+1M LiPF$_6$+1% VC) battery versus Reference (LMFP+4% PVDF-LTO-PC/EMC/DMC (4/3/3)+1M LiPF$_6$+1% VC); A) Charge B) Discharge.
Figure 21B:
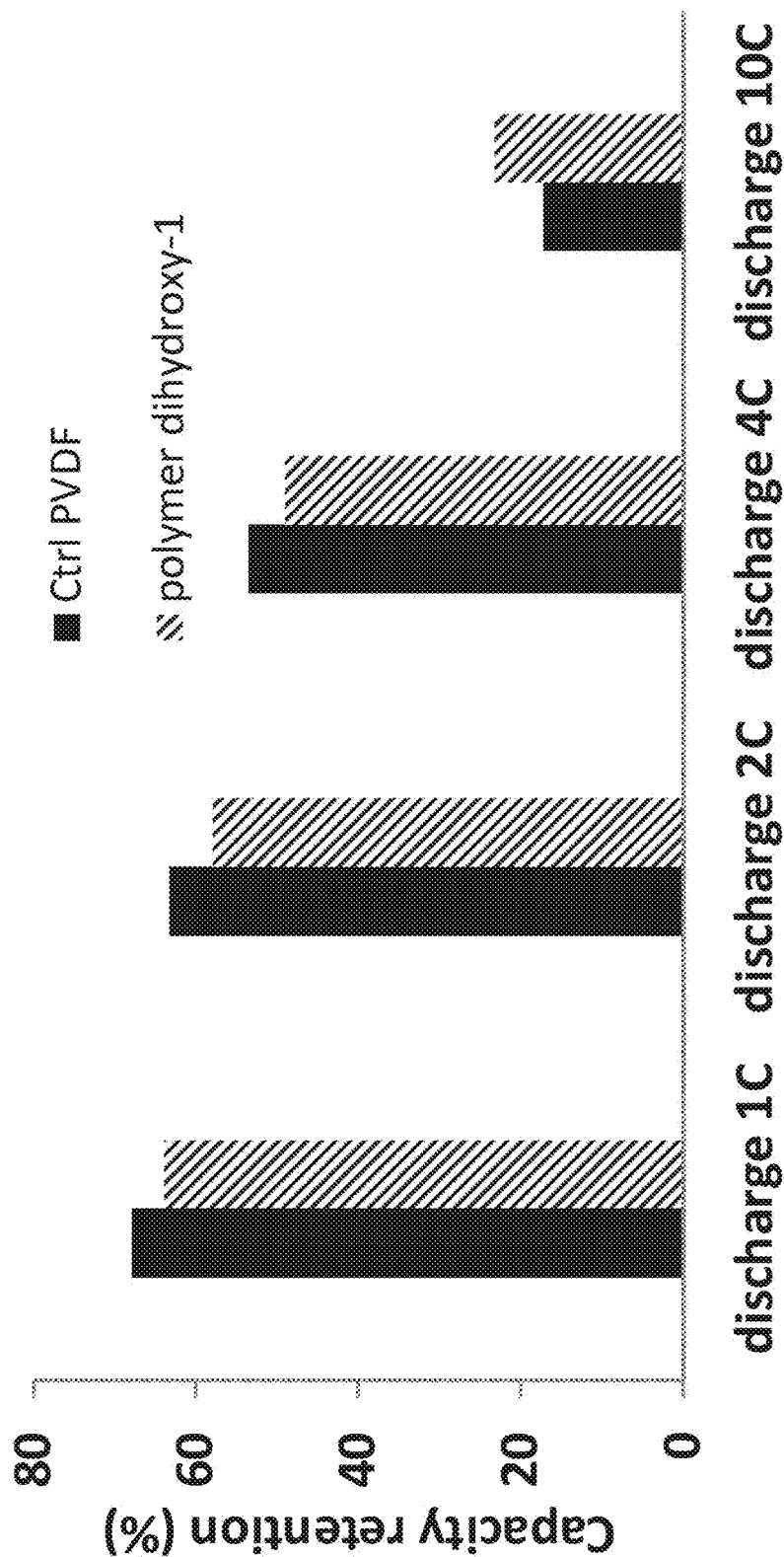
Figure 22:
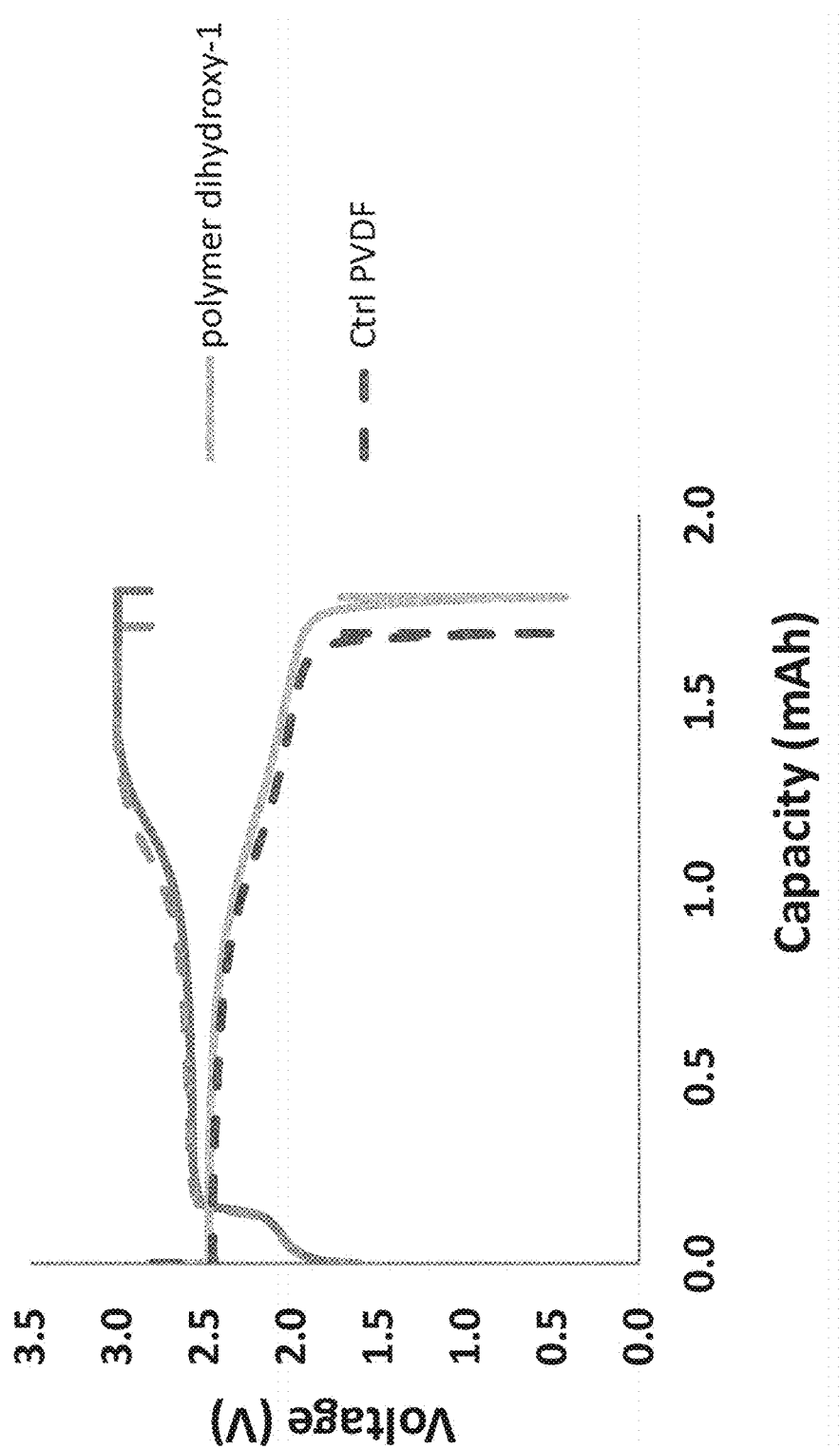
FIG. 22: Charge-Discharge of (LMFP+4% PVDF+1% additive (binder) according to the invention (polymer comprising 50 mol % dihydroxystyrene moieties or "Polymer dihydroxy-1")-LTO-PC/EMC/DMC (4/3/3)+1M LiPF$_6$+1% VC) battery versus Reference (LMFP+4% PVDF-LTO-PC/EMC/DMC (4/3/3)+1M LiPF$_6$+1% VC).

Referring to FIGS. 19-22, the polymer comprising dihydroxystyrene moieties is also used for complexation. FIG. 18 shows the capacity retention when Polymer dihydroxy-1 (polymer comprising 50 mol % dihydroxystyrene moieties) is used. No major improvement is observed. However, as can be seen in FIG. 20, a decrease of the resistance of the material is observed after 300 cycles. It should be noted that before cycling no major difference is noted between the Reference and the battery according to the invention. Capacities recorded after 300 cycles are higher when the additive (binder) according to the invention is used. The charge/discharge at various C-rates shows a good improvement at 2 C.

As will be understood by a skilled person, the additive for use in association with the electrolyte and the additive (binder) for use in association the cathode active material are adapted to be compatible with the components of the battery including the electrolyte and the cathode active material.

The scope of the claims should not be limited by the preferred embodiments set forth in the examples; but should be given the broadest interpretation consistent with the description as a whole.

The present description refers to a number of documents, the content of which is herein incorporated by reference in their entirety.

REFERENCES

1. D. Mohanty, J. Li, D. P. Abraham, A. Huq, E. A. Payzant, D. L. Wood, C. Daniel, Chemistry of Materials, 26 (2014) 6272-6280.
2. M. Saulnier, A. Auclair, G. Liang, S. B. Schougaard, Solid State Ionics, 294 (2016) 1-5.
3. Z. Shiming, G. Haitao, P. Hongge, Y. Suhui, D. Wubin, L. Xiang, G. Mingxia, L. Yongfeng, Z. Min, O. Liuzhang, J. Dechao, P. Feng, Advanced Energy Materials, 7 (2017) 1601066.
4. A. Tomheim, M. He, C.-C. Su, Z. Zhang, Journal of the Electrochemical Society, 164 (2017) A6366-A6372.
5. U.S. Pat. Nos. 5,846,673; 7,749,660; 10,008,749.
6. G. Westwood, T. N. Horton, J. J. Wilker, Macromolecules, 40 (2007) 3960-3964.
7. Z. Xu, Scientific Reports, 3 (2013) 2914.

The invention claimed is:

1. A polymer compound having a general formula VI outlined below

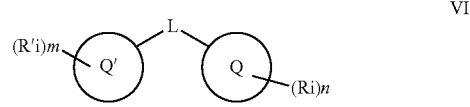

VI wherein:
Q and Q' are each independently a 5 to 12-member ring or bicycle ring, optionally either ring comprises one or more heteroatom which are the same or different;
L is a linker comprising alkyl groups;
Ri and R'i are each independently selected from H, alkyl, cycloalkyl, alkene, alkyne, aryl and alkylaryl, alkoxy, thioalkoxy, OH, SH, $NH_2$, a halogen atom, a halogeno alkyl, a halogeno alkoxy, a halogeno thioalkoxy, a cyano alkyl, a cyano alkene, a cyano alkyne, CN, $NO_2$, $SO_2$, COOH and acyloxycarbonyl, with the proviso that at least one of Ri comprises a heteroatom and at least one of R'i is different from H;
n and m are each independently an integer from 0 to 11 with the proviso that they are not both 0 at the same time; and
the one or more heteroatom of Q or Q' is selected from O, S and N.

2. The polymer according to claim 1, wherein at least two of Ri comprise a heteroatom, and the at least two of Ri are attached to consecutive carbon atoms of the ring; or when Q is a bicycle ring the at least two of Ri are spatially close to each other.

3. The polymer according to claim 1, wherein the at least one R'i is a halogen atom, optionally F.

4. The polymer compound according to claim 1 having a general formula VII outlined below

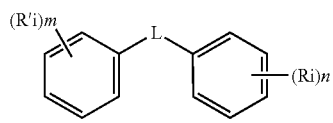

wherein:
  at least two of Ri comprise a heteroatom, and the at least two of Ri are attached to consecutive carbon atoms of the ring; or when Q is a bicycle ring the at least two of Ri are spatially close to each other; and
  the at least one R'i is a halogen atom, optionally F.

5. The polymer compound according to claim 1 having a general formula VIII outlined below

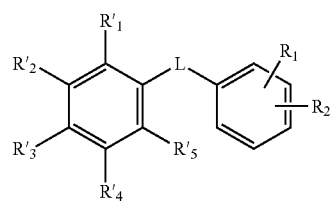

wherein:
  both $R_1$ and $R_2$ comprise a heteroatom, optionally both $R_1$ and $R_2$ comprise a heteroatom, and are attached to consecutive carbon atoms of the ring; and
  $R'_{1-5}$ are each a halogen atom, optionally F.

6. The polymer compound according to claim 1 having a general formula IX outlined below

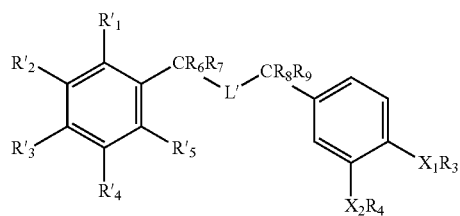

wherein:
  $R_3$, $R_4$ and $R_{6-9}$ are each independently H or a $C_{1-6}$ alkyl;
  $R'_{1-5}$ are each a halogen atom, optionally F;
  L' is constituted of repeating units of $CR_6R_7$ and $CR_8R_9$; and
  $X_1$ and $X_2$ are each independently a heteroatom, optionally the $X_1$ or $X_2$ heteroatom is O, S or N.

7. The polymer compound according to claim 6 having a formula P outlined below

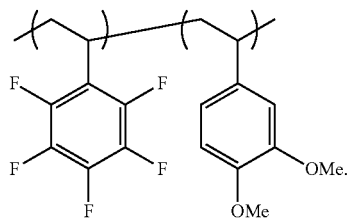

8. The polymer compound according to claim 6 having a formula P' outlined below

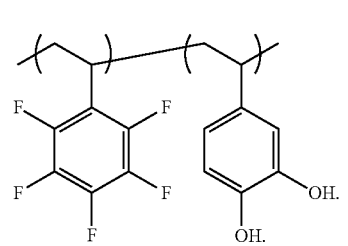

9. The polymer according to claim 7, which is selected from the group consisting of: polymer of formula P, which comprises 48 mol % of dimethoxystyrene moities (Polymer dimethoxy-1); polymer of formula P, which comprises 70 mol % of dimethoxystyrene moities (Polymer dimethoxy-2); and polymer of formula P, which comprises 100 mol % of dimethoxystyrene moities (Polymer dimethoxy-3).

10. The polymer according to claim 8, which is: polymer of formula P', which comprises 50 mol % of dihydroxystyrene moities (Polymer difydroxy-1).

11. A method of preventing metal ions dissolution in a Li-ion battery comprising metal-based cathode material which produces $M^{2+}$ metal ions, the method comprising using adding a polymer compound in association with to the cathode material of the battery, wherein the polymer compound is as defined in claim 1.

12. A cathode material comprising the polymer compound as defined in claim 1.

13. A battery comprising the cathode material as defined in claim 12.

14. A method for preparing the polymer compound as defined in claim 1, comprising submitting a dialkyloxystyrene compound and a pentahalogenostyrene compound to a random copolymerization to obtain an alkyoxystyrene polymer; and optionally submitting the alkyoxystyrene polymer to a dealkylation process to obtain a hydroxy polymer compound.

15. The method according to claim 14, wherein the dialkyloxystyrene compound is dimethoxystyrene, and the pentahalogenostyrene compound is pentafluorostyrene.

16. A method for preparing the polymer compound of formula P as defined in claim 7, comprising submitting dimethoxystyrene and pentafluorostyrene to a random copolymerization.

17. A method for preparing the polymer compound of formula P' as defined in claim 8, comprising submitting a polymer compound of formula P to a demethylation process:

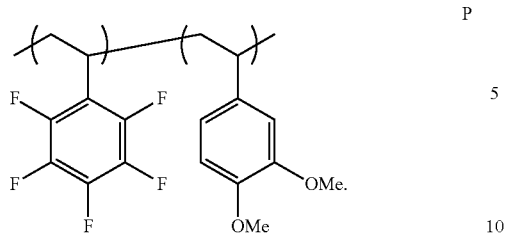

18. A method for preparing the polymer compound as defined in claim 1, comprising submitting a dialkyloxystyrene compound and a pentahalogenostyrene compound to a polymerization process which is atom transfer radical polymerization (ATRP), atom transfer radical addition polymerization (ATRAP), retarded anionic polymerization (RAP), or cationic polymerization.

* * * * *